United States Patent
Nambi et al.

(10) Patent No.: US 9,501,993 B2
(45) Date of Patent: Nov. 22, 2016

(54) LOW POWER DISPLAY DEVICE WITH VARIABLE REFRESH RATES

(71) Applicant: Apple Inc., Cupertino, CA (US)

(72) Inventors: Prasanna Nambi, Cupertino, CA (US); Jason N. Gomez, Campbell, CA (US); Fenghua Zheng, San Jose, CA (US); Paolo Sacchetto, Cupertino, CA (US); Sandro H. Pintz, Menlo Park, CA (US); Taesung Kim, Los Altos, CA (US); Christopher P. Tann, San Jose, CA (US); Marc Albrecht, San Francisco, CA (US); David W. Lum, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/155,292

(22) Filed: Jan. 14, 2014

(65) Prior Publication Data

US 2014/0198114 A1    Jul. 17, 2014

Related U.S. Application Data

(60) Provisional application No. 61/752,390, filed on Jan. 14, 2013.

(51) Int. Cl.
G09G 3/36    (2006.01)

(52) U.S. Cl.
CPC .............. *G09G 3/3696* (2013.01); *G09G 3/36* (2013.01); *G09G 3/3611* (2013.01);
(Continued)

(58) Field of Classification Search
CPC .............. G09G 2340/0435; G09G 2320/062; G09G 2320/0633; G09G 5/10
See application file for complete search history.

(56) References Cited

U.S. PATENT DOCUMENTS

| | | |
|---|---|---|
| 5,138,449 A | 8/1992 | Kerpchar |
| 5,892,494 A | 4/1999 | Kimura et al. |

(Continued)

FOREIGN PATENT DOCUMENTS

| | | |
|---|---|---|
| CN | 102610201 A | 7/2012 |
| EP | 2973526 | 1/2016 |

(Continued)

OTHER PUBLICATIONS

International Search Report and Written Opinion mailed May 29, 2014 in PCT/US2014/011419.

(Continued)

*Primary Examiner* — Jeffery A Brier
(74) *Attorney, Agent, or Firm* — Downey Brand LLP

(57) ABSTRACT

The disclosure describes procedures for dynamically employing a variable refresh rate at an LCD display of a consumer electronic device, such as a laptop computer, a tablet computer, a mobile phone, or a music player device. In some configurations, the consumer electronic device can include a host system portion, having one or more processors and a display system portion, having a timing controller, a buffer circuit, a display driver, and a display panel. The display system can receive image data and image control data from a GPU of the host system, evaluate the received image control data to determine a reduced refresh rate (RRR) for employing at the display panel, and then transition to the RRR, whenever practicable, to conserve power. In some scenarios, the transition to the RRR can be a transition from a LRR of 50 hertz or above to a RRR of 40 hertz or below.

20 Claims, 22 Drawing Sheets

(52) U.S. Cl.
CPC ......... *G09G 3/3618* (2013.01); *G09G 3/3655* (2013.01); *G09G 2330/02* (2013.01); *G09G 2330/021* (2013.01); *G09G 2340/0435* (2013.01); *G09G 2360/18* (2013.01); *G09G 2370/08* (2013.01)

(56) References Cited

U.S. PATENT DOCUMENTS

| | | | |
|---|---|---|---|
| 6,147,664 | A | 11/2000 | Hansen |
| 6,266,035 | B1 | 7/2001 | Palalau |
| 6,271,813 | B1 * | 8/2001 | Palalau ............... 345/77 |
| 6,456,268 | B1 | 9/2002 | Takeda |
| 7,184,001 | B2 | 2/2007 | Chen |
| 2002/0021275 | A1 * | 2/2002 | Kataoka et al. ............ 345/102 |
| 2002/0075249 | A1 | 6/2002 | Kubota et al. |
| 2002/0126112 | A1 | 9/2002 | Kato |
| 2005/0073490 | A1 | 4/2005 | Kojima et al. |
| 2005/0083280 | A1 | 4/2005 | Hiraki et al. |
| 2005/0088280 | A1 | 4/2005 | Beehler et al. |
| 2006/0071882 | A1 | 4/2006 | Sempel |
| 2006/0146056 | A1 * | 7/2006 | Wyatt ............... 345/501 |
| 2007/0063959 | A1 | 3/2007 | Iwabuchi et al. |
| 2007/0097107 | A1 | 5/2007 | Furukoshi |
| 2009/0195484 | A1 | 8/2009 | Lee et al. |
| 2010/0134473 | A1 | 6/2010 | Matsuda et al. |
| 2010/0277512 | A1 | 11/2010 | Shen et al. |
| 2012/0182332 | A1 | 7/2012 | Liu |
| 2012/0188224 | A1 | 7/2012 | Lee et al. |
| 2013/0265294 | A1 | 10/2013 | Kim |

FOREIGN PATENT DOCUMENTS

| | | |
|---|---|---|
| JP | 1993196914 | 6/1993 |
| JP | 1996184809 | 7/1996 |
| JP | 2002-062838 | 2/2002 |
| JP | 2002268612 | 9/2002 |
| JP | 2005003692 | 1/2005 |
| JP | 2009058675 | 3/2009 |
| JP | 2009229961 | 10/2009 |
| KR | 10-2007-0076078 | 7/2007 |
| TW | M253877 | 12/2004 |
| TW | I243909 B | 11/2005 |
| TW | 200614132 | 5/2006 |
| TW | 200717407 | 5/2007 |
| TW | I291831 B | 12/2007 |
| WO | WO2014143484 A1 | 9/2014 |

OTHER PUBLICATIONS

Taiwanese Patent Application No. 103101369—Office Action dated Nov. 20, 2015.
Taiwanese Patent Application No. 103101368—Office Action dated Apr. 22, 2016.
Taiwanese Patent Application No. 103101370—Office Action dated Apr. 7, 2016.
European Patent Application No. 14737800.4—Supplementary European Search Report dated Jul. 11, 2016.
Japanese Patent Application No. 2015-552882—First Office Action dated Jul. 15, 2016.

* cited by examiner

LOW POWER DISPLAY DEVICE WITH VARIABLE REFRESH RATES

CROSS-REFERENCE TO RELATED APPLICATIONS

This application claims priority filing benefit to U.S. Provisional Patent Application No. 61/752,390, filed on Jan. 14, 2013, the content of which is incorporated herein by reference in its entirety. This application is related to U.S. Nonprovisional patent application Ser. No. 14/155,297, filed on Jan. 14, 2014, and U.S. Nonprovisional patent application Ser. No. 14/155,300, filed on Jan. 14, 2014, the contents of which are incorporated herein by reference in their entirety.

FIELD

The described embodiments generally relate to apparatus and methods for reducing power consumption of device displays by monitoring various image presentation processes and dynamically reducing a device's image refresh rate whenever practicable.

BACKGROUND

Many modern personal computing devices are configured with high-resolution, color liquid crystal displays (LCDs) that can employ a complex matrix (e.g., an active-matrix) of switching thin-film transistors (TFTs) and pixel storage capacitors, vertical and horizontal polarizing filters, color filters, a liquid crystal layer, a light emitting diode (LED) backlight system, etc. As would be understood by those having ordinary skill in display technologies, active-matrix addressed TFT displays typically appear brighter, present sharper images, and exhibit improved response times, as compared to their passive-matrix addressed TFT display counterparts (e.g., passive-matrix displays of a similar size).

Within these active-matrix LCD displays, a specific column line may be charged to illuminate a single display pixel, or multiple display pixels along different row lines, by selectively switching on a TFT(s) associated with a corresponding pixel address(es) (e.g., a pixel addressed to a single row line). When a TFT is switched on, a corresponding pixel storage capacitor may be charged along the column line to twist liquid crystals of the pixel enough to allow light from an LED backlight system to pass through the liquid crystal layer and illuminate the pixel. The color of the illuminated pixel is defined by its applied color filter. In this manner, individual pixels can be illuminated by supplying current, and therefore power, to a particular column line within an LCD display. A display driver or controller may be employed to dynamically manage current flow to each of the column lines within an LCD display and/or to gate TFTs (e.g., turning TFTs on/off) in corresponding row lines.

Unfortunately, one major power drain of LCD displays occurs when images presented at a display are periodically refreshed, in accordance with a live refresh rate (LRR) that may be assigned by a device manufacturer. The default LRR of a device display can be driven by a timing controller entity that is statically configured by a graphics processor unit (GPU), or another designated system-on-chip (SoC) component of a host system, to ensure that a constant LRR is maintained at the display, regardless of what image presentation processes are being performed at the device or what image content is being (or will be) presented at the display. In many different types of personal computing devices the LRR for a device's LCD display is standardized at a refresh rate of 50 or 60 Hertz (Hz). However, with the recent emergence of high-definition (HD) 3-dimentional (3D) display systems, LRRs have increased to 120 Hz and 240 Hz. This trend is expected to continue, such that future display technologies may have LRRs of 300 Hz, or beyond.

The LRR of a device display is proportional to its power consumption; the higher the LRR is for a particular display type the more power that display will consume. As such, device display power consumption is an increasing area of interest for scientists and engineers working in the field of consumer electronics displays. Many portable electronic devices (e.g., laptop computers, tablet computers, mobile phones, electronic book devices, music players, etc.) having a limited, exhaustible battery life, can perform routine display procedures that do not necessitate a LRR equal to or exceeding 50 or 60 Hz. In these scenarios, it would be advantageous to be able to dynamically detect different device states and/or display operations that do not require such a conservative LRR, and then lower a corresponding device's display refresh rate accordingly, to minimize power consumption and extend device mobility.

By way of example, in some situations, a device display may be controlled to present a single image frame that will not change over a known period of time. During this established time interval, the device display may be in what is known as a screen-on-idle mode, which does not require a display screen image refresh action. However, in an effort to prevent a detrimental "screen burn," and to limit display component degradation, it still may be necessary to refresh a static display screen image during the screen-on-idle mode. As such, it would be beneficial to be able to reduce the refresh rate of a device display to be less than the device's default LRR in many situations, including the scenarios described above. Accordingly, there exists a need for a solution that can dynamically reduce a device's display refresh rate to minimize power consumption, without degrading a user's visual experience. In this regard, it would be desirable to be able to compensate for reduced brightness levels and other visual artifacts that can result from operating a display at reduced refresh rates.

SUMMARY

The present disclosure describes apparatus and methods for dynamically adjusting a device display refresh rate in response to various graphical presentation operation determinations within a display system to conserve exhaustible device resources. In accordance with some aspects of the disclosure, a variable refresh rate can be dynamically employed at a liquid crystal display (LCD) of a consumer electronic device (e.g., a laptop computer, a tablet computer, a mobile phone, or a music player device).

In various aspects, a consumer electronic device can include a host system portion having one or more processors and a display system portion having: a timing controller, a buffer circuit, a display driver, and a display panel. In various configurations, the display system can receive both image data and image control data from a graphics processor unit (GPU) or a central processing unit (CPU) of the host system, evaluate the received image control data to determine a reduced refresh rate (RRR) for employing at the display panel, and then transition the LCD from a live refresh rate (LRR) to the RRR (e.g., while presenting the image data), whenever practicable, in an effort to conserve power and extend device mobility.

In accordance with some aspects, the buffer circuit of an LCD display system can include a reference voltage bank selection component storing a plurality of register values, a plurality of operational amplifiers, and a plurality of image buffers for buffering received image data.

In one aspect, the buffer circuit may be configured to receive a reference voltage input selection, compare the reference voltage input selection to the plurality of register values, select a target reference voltage value based on the comparison, and transmit the target reference voltage value to the LCD to change a luminosity of the LCD when the LCD is operating at a reduced refresh rate.

In yet another aspect of the disclosure, at the buffer circuit, the reference voltage input selection can be received at a dedicated hardware pin that is coupled to the buffer circuit from a display timing controller.

In other aspects, a column driver of an LCD may include both frontend circuitry for receiving input signals from a source GPU and backend circuitry for outputting a reference voltage to an LCD display panel, such as a thin film transistor (TFT) panel. Further, the column driver can be configured to receive at least one input signal from a display controller, determine one or more settings from the at least one input signal, and shut down at least a portion of the column driver based on the one or more settings of the at least one input signal.

In accordance with an aspect of the disclosure, a first setting of the one or more settings may be received as an input signal at a dedicated hardware pin of the column driver.

In another aspect of the disclosure, the first setting can be a non-protocol setting that is configured to shut down all circuitry of the column driver.

In one scenario, a second setting of the one or more settings may be a protocol setting that is not capable of shutting down a digital circuit portion of the column driver.

In accordance with another aspect of the disclosure, a timing controller of a LCD can include clock circuitry for regulating refresh rate timing, buffer drive circuitry for driving a buffer circuit of the LCD, and display panel drive circuitry for controlling a display driver of a display panel of the LCD.

In some aspects, the timing controller may be configured to receive an image control data from a GPU of a host system, evaluate the received image control data to determine a RRR for the display panel, and then transmit display control signaling information associated with the RRR to one or more components of the LCD to affect a transition to the RRR.

In another aspect of the disclosure, the transition to the RRR is a transition from a live refresh rate (LRR) of 50 hertz or above to a RRR of 40 hertz or below.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Representative examples for implementing a variable refresh rate at a device display to reduce power consumption of a consumer electronic device are described within this section. In some configurations, various display brightness and image presentation compensation techniques can be employed at a device to eliminate or substantially reduce one or more negative effects (e.g., the presentation of unwanted visible artifacts) associated with operating a device display at a reduced refresh rate (RRR), as opposed to operating the device at a default live refresh rate (LRR). This disclosure describes several examples for dynamically reducing a device's display refresh rate to achieve the above objectives, as well as to realize various other advantages that are described further herein.

The provided examples are intended to add context to, and to aid in the understanding of, the cumulative subject matter of the disclosure. Reference in the specification to "one embodiment," "an embodiment," "some embodiments," or "various embodiments," "one implementation," "an implementation," "some implementations," or "various implementations," etc., are indications that a particular feature(s), structure(s), or characteristic(s), described in connection with an exemplary implementation, can be included in at least one embodiment of the disclosure. The appearance of any of the above phrases within the specification does not necessarily refer to a single or a related embodiment or implementation. Further, the display processes described herein, and depicted in the figures, may be performed by processing logic that comprises hardware (e.g., graphics processor circuitry, dedicated display logic units, etc.), software (e.g., program code that can be executed at a personal computing device), or any combination thereof.

Although various display presentation processes are described below in terms of one or more sequential operations, it should be appreciated that any portion of the sequential operations described herein may be performed in a different order, or in parallel, without departing from the spirit and scope of the disclosure. For instance, many modern graphics processors are configured to perform numerous imaging operations in parallel to improve image data throughput for a display system. Further, it should be apparent that the embodiments discussed in this disclosure may be practiced with or without some of the specific details described herein. In this regard, various modifications and/or alterations can be made to the subject matter described herein, and illustrated in the corresponding figures, to achieve similar advantages and results. Therefore, the various embodiments and examples of this disclosure are not to be construed as being overly-limiting or all-inclusive.

Figure 1:
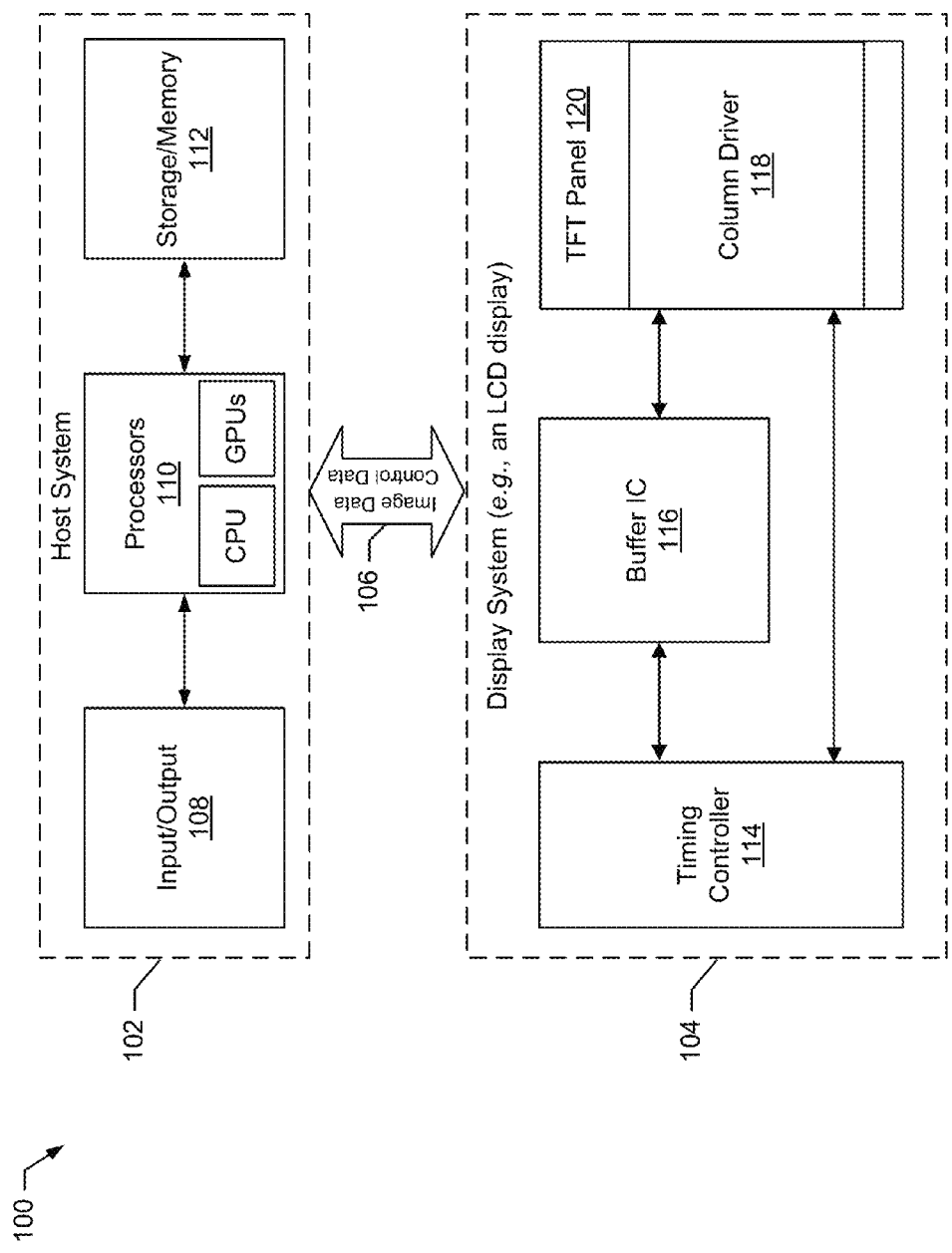
FIG. 1 shows a block diagram depicting a host system and display system that are coupled by a system interface, in accordance with various embodiments of the disclosure.

FIG. 1 shows a block diagram 100 depicting a host system 102 and a display system 104 that are coupled by a system interface 106, in accordance with various embodiments of the disclosure. In some implementations, the host system 102 and the display system 104 may be consolidated within a single device and/or within the same device housing. In this configuration, the consolidated device may correspond to a laptop computer, a tablet computer, a cellular phone, a music player device, an electronic book device, a portable gaming device, or any other type of media playback device, an in-vehicle entertainment/navigation system, a medical or scientific device, etc. Within such a consolidated device, the system interface 106 may correspond to a system bus or any another wireline connection that can employ a common wireline interface communication protocol for communicating image data and image presentation control data between the host system 102 and the display system 104.

In other embodiments, the host system 102 and the display system 104 may be distributed as separate or separable devices that are capable of being coupled via the system interface 106. In this scenario, the system interface 106 can consist of any common type of wireline communication interface or any common type of short-range wireless communication interface, as part of a wired or wireless local area network (LAN), or alternatively, as part of a wired or wireless personal area network (PAN). By way of example, in the distributed device configuration, the display system 104 may correspond to a stand-alone electronic visual display device, such a computer monitor or any other type of flat-panel display device (e.g., a liquid crystal display (LCD) television) that can be coupled to a host system 102 (e.g., a DVD or Blu-Ray® player device, a laptop computer, a tablet computer, etc.) via the system interface 106, to facilitate image data and control data communications between the host system 102 and the display system 104.

In accordance with some configurations, the host system 102 can include, but is not limited to including, an input-output (I/O) component 108 for communicating data with external devices, one or more processor(s) 110, such as a central processing unit (CPU) and any number of graphics processing units (GPUs) or visual processing units (VPUs), which may be integrated within a system on chip (SoC) integrated circuit (IC), and a storage or memory component 112 that can consist of any combination of common types of volatile and non-volatile memory. Further, in some implementations, the display system 106 (e.g., an LCD display) may include, but is not limited to including, a timing controller (TCON) 114, a buffer IC component 116 (e.g., consisting of image frame buffers), a column driver (CD) 118, and a thin film transistor (TFT) display panel 120. It should be understood that host system 102 and the display system 104 are depicted within a high-level diagram, and as such, the host system 102 or the display system 104 may be configured to optionally include additional circuit components necessary for carrying out any of the display refresh rate and display image compensation processes described further herein, without departing from the spirit and scope of the disclosure.

As described in further detail herein, in some embodiments, one or more processors 110 (e.g., a CPU and/or a GPU) of the host system 102 can be employed to communicate image data and/or control data (e.g., refresh rate information and/or image compensation information) with the TCON 114 and/or the buffer IC component 116 of the display system 104 to configure the display system 104 to employ one or more RRRs. In some implementations, the processors 110 can configure the TCON 114 with a RRR when a determination is made (e.g., by the processors 110 of the host system 102 and/or a component of the display system 104) that an existing live refresh rate (LRR) is not required to display a particular image content during a current or future imaging operation.

By way of example, in some embodiments, any of the processors 110 of the host system 102 may be configured to dynamically determine that an image content being displayed at the TFT panel 120, or an image content to be displayed at the TFT panel 120 (e.g., buffered image data of the buffer IC component 116), corresponds to static image content that does not need to be refreshed in accordance with the existing LRR (e.g., a default image refresh rate of 60 Hz). In this scenario, a RRR (e.g., a reduced image refresh rate of 30 Hz) can be employed by the TCON 114 (in response to the determination) to cause the CD 118 to refresh static image content displayed at the TFT panel 120 at a lower display refresh rate, thereby substantially reducing power consumption at the display system 104 during the time interval when the RRR is being employed by the display system 104.

Alternatively, in another embodiment, the buffer IC component 116 can be configured to dynamically lower the refresh rate (independent from host system 102 control), while the buffer IC component 116 is refreshing a particular screen image from one of its local frame buffers. This may occur when the buffer IC identifies image buffer content or an image frame that does not need to be refreshed (e.g., when the TFT panel 120 is in a screen-on-idle mode). In other embodiments, the TFT panel 120 (including the CD 118) may be configured to dynamically compare received image frames (e.g., video data frames) to identify repeat image frames. In this scenario, the TFT panel 120 can make a decision to drop one or more identified repetitive image frames in an effort to conserve power during the dropped frame times. In these scenarios, RRRs and/or reduced frame presentations can be rapidly and autonomously managed by the display system 104, without any input from (or with minimal input from) the processors 110 of the host system 102.

In accordance with some embodiments, the buffer IC component 116 of the display system 106 may be configured to receive image data from any of the processors 110 of the host system 102, buffer one or more image frames from the received image data, and then drive the presentation of the buffered image frame(s) at the TFT panel 120 in collaboration with the TCON 114 and/or the CD 118 entities. Additionally, in some configurations, the buffer IC component 116 can be configured to employ various image compensation mechanisms to eliminate or minimize the occurrence of various image presentation defects or artifacts that may occur while transitioning between two distinct display refresh rates, or while employing a RRR at the TFT panel 120. Various corresponding image compensations mechanisms are described in further detail herein.

Figure 2:
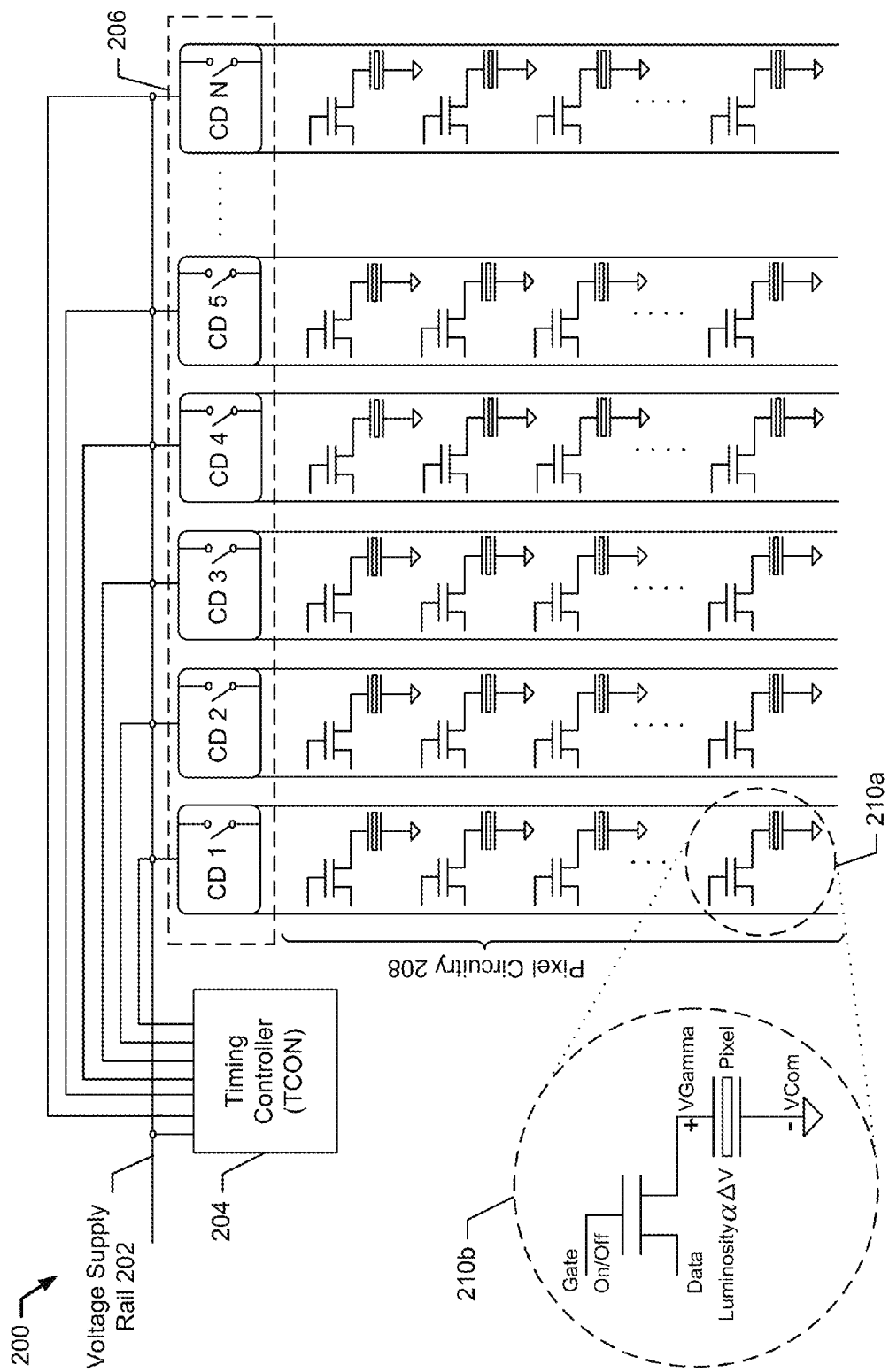
FIG. 2 shows a display system diagram depicting a timing controller (TCON) that is configured to drive a column driver (CD) to employ a variable refresh rate, in accordance with some embodiments of the disclosure.

FIG. 2 shows a display system diagram 200 depicting a TCON 204 that is configured to drive a CD 206 (e.g., via one or more dedicated input pins at the CD 206) to employ a variable refresh rate, in accordance with various embodiments of the disclosure. As will be described further herein, timing control signaling from the TCON 204 can be communicated to the CD 206 to cause the CD 206 to operate the pixel circuitry 208 of the TFT panel 120 at any number of different RRRs, such as when the default LRR is determined to be an overly-conservative refresh rate value for presenting various image frame content. In some implementations, the CD 206 may be composed of any number of column drivers (e.g., CD1 through CDN) that can respectively control individual columns of pixel circuitry 208 to supply a charge from a voltage supply rail 202 to one or more column lines of the TFT panel 120 in various manners. It should be understood that TCON 204 and the CD 206 are depicted within a high-level diagram, and as such, the TCON 204 and the CD 206 may be configured to optionally include additional circuit components necessary for carrying out any of the display refresh rate and display image compensation processes described further herein.

In accordance with some embodiments, the pixel circuitry 208 may be composed of an active-matrix of individual pixel circuits 210a having a TFT and a pixel storage capacitor. An exploded view of a single pixel circuit 210b, is shown to illustratively depict basic principles of pixel illumination. For instance, when the CD 206 sends a charge to the column line associated with CD1, the pixel circuit 210a-b may be activated by opening the transistor gate (e.g., turning the transistor on) to charge the pixel storage capacitor and illuminate a pixel. In accordance with some embodiments, the luminance of a pixel can be defined by the voltages applied at opposing sides of the pixel storage capacitor (e.g., VGamma and VCom). When the difference between the voltages (e.g., represented as ΔV, which is equal to VGamma-VCom) of a pixel storage capacitor is maximized the pixel will appear brighter with a higher luminance; conversely, when the difference between the voltages of a pixel storage capacitor is minimized, the pixel will have a lower luminance and will appear less bright.

Figure 3:
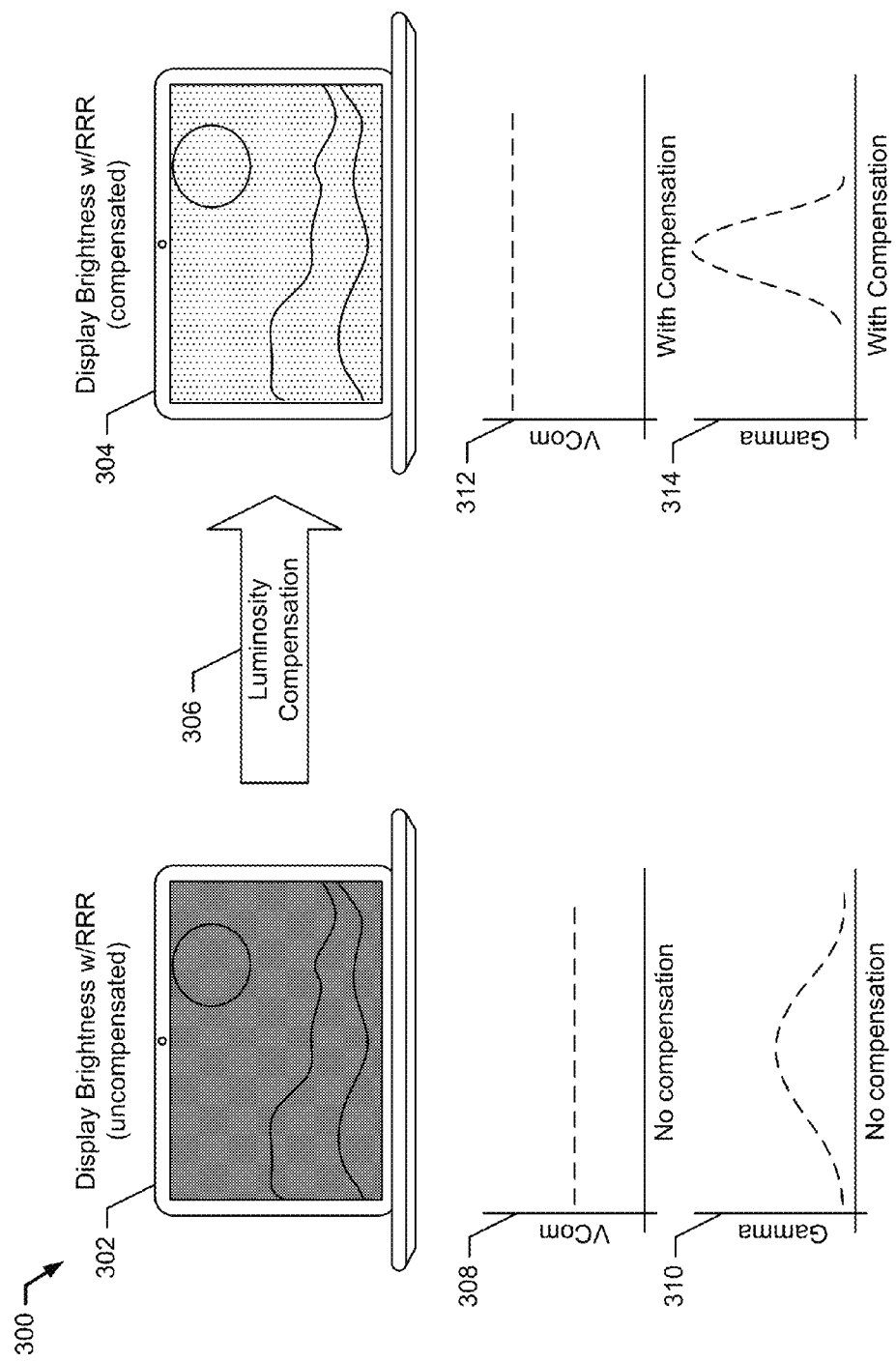
FIG. 3 shows a diagram depicting both an uncompensated device display presentation employing a reduced refresh rate (RRR) and a compensated device display presentation employing the same RRR, in accordance with some implementations of the disclosure.

The human eye is highly sensitive to small image discrepancies, which are commonly referred to as image artifacts. In modern LCD device displays, a device's employed display refresh rate is directly proportional to its display screen's luminosity or brightness. Accordingly, in the absence of image presentation compensation, a change in a device's display refresh rate will effect a perceptible change in a display's brightness. FIG. 3 shows a diagram 300 depicting both an uncompensated device display presentation employing a reduced refresh rate (RRR) 302, and a compensated device display presentation employing the same RRR 304. Prior to any luminosity compensation 306 being applied, the screen brightness of a device display presentation employing a RRR 302 may have a relatively low luminosity at its existing VCom 308 and VGamma 310 reference voltage levels. However, in accordance with some embodiments of the disclosure, when various luminosity compensation techniques 306 are applied (e.g., via the buffer IC 116), the screen brightness of the device display presentation employing the same RRR 304 may achieve a higher luminosity in proportion to modified/compensated VCom 312 and VGamma 314 reference voltage levels.

In accordance with some configurations, the buffer IC 116 may be employed in combination with existing Gamma bank switching implements to compensate for frame-by-frame refresh rate changes, such as when a RRR is being applied at a TFT panel 120. Further, the buffer IC 116 can also be configured to eliminate or reduce visual artifacts caused by changing the refresh rate during image presentation processes, as described further herein. In accordance with some implementations, programmable gamma buffer (PGB) circuits of the buffer IC 116 can be configured to provide brightness reference levels (e.g., VGamma) to the source driver circuitry (e.g., the CD 118) of the TFT panel 120. Additionally, VCom circuitry of the buffer IC 116 may be configured to provide a common voltage reference for all pixels of the TFT panel 120. Both the PGB and the VCom circuitry of the buffer IC 116 can affect display screen brightness (e.g., in proportion with the ΔV).

Figure 4:
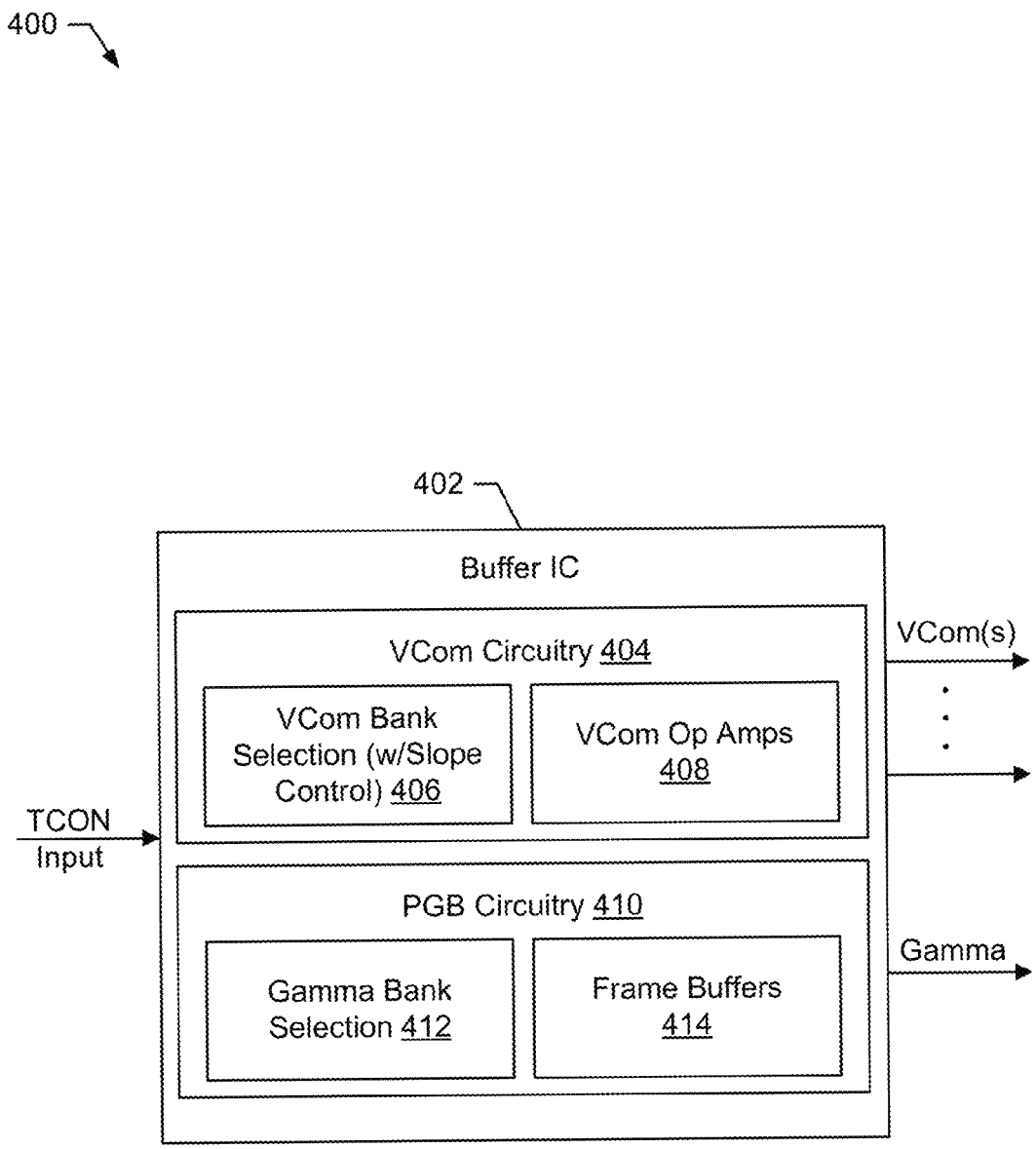
FIG. 4 shows a block diagram of a display system buffer integrated circuit (IC), in accordance with various embodiments of the disclosure.

FIG. 4 shows a block diagram 400 of a display system buffer IC 402, in accordance with various embodiments of the disclosure. The buffer IC 402 may comprise, but is not limited to comprising, VCom circuitry 404 including a VCom bank selection component 404 and any number of VCom Op Amps 408, as well as PGB circuitry 410 having a Gamma bank selection component 412 and any number of frame buffers 414. In accordance with various embodiments, the VCom circuitry 404 may be configured to generate any number of distinct VCom outputs, whereas the PGB circuitry can be configured to generate various Gamma outputs. These VCom and Gamma outputs may be generated/derived from various inputs received at the buffer IC 402 from the TCON 114. It should be understood that the buffer IC 402 is depicted as a high-level diagram, and as such, the buffer IC 402 can be configured to optionally include additional circuit components necessary for carrying out any of the display refresh rate and display image compensation processes described further herein.

In some implementations, the buffer IC 402 of a display system 104 can be configured to support discontinuous modes of operation for both reduced and increased refresh rate implementations. For example, in a scenario where the TCON 114 employs an increased refresh rate at the TFT Panel 120, thereby increasing the perceived display screen brightness, the buffer IC 402 may be configured to compensate for unwanted luminosity increases by decreasing screen brightness accordingly (e.g., by reducing the ΔV). In these scenarios, the buffer IC 402 can be configured to support on-the-fly refresh rate modification, targeting variable refresh rate transitions. In some embodiments, dedicated hardware signals emanating from the TCON 114 can be employed by the buffer IC 402 to dynamically adjust the VCom circuitry 404 VCom outputs, as well as the PGB circuitry 410 Gamma outputs; these adjustments may be performed on a frame-by-frame basis.

Figure 5:
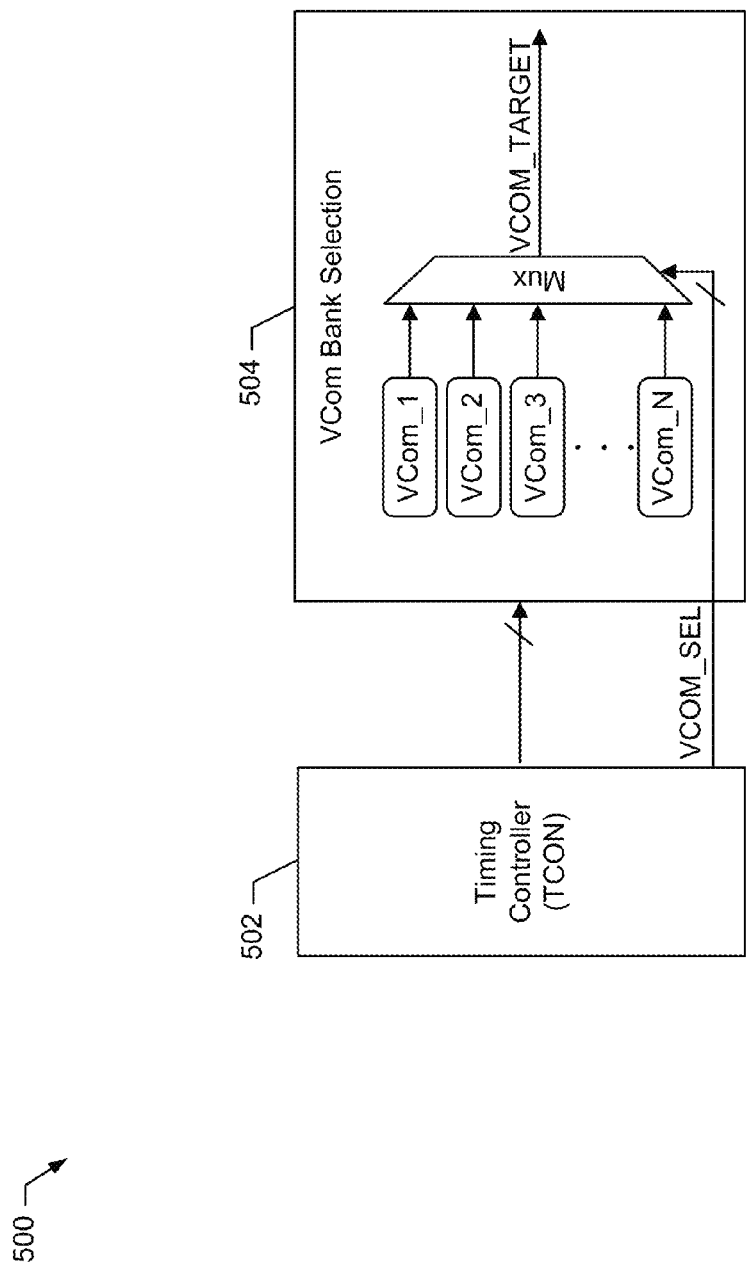
FIG. 5 shows a block diagram of a bank selection component of a buffer IC that can select a target output voltage using a dedicated hardware pin to receive an input from the TCON, in accordance with some embodiments of the disclosure.

FIG. 5 shows a block diagram 500 of a bank selection component 504 of a buffer integrated circuit (IC) 402 that can select a target VCom output (VCOM_TARGET) using a dedicated hardware pin (VCOM_SEL) to receive input from the TCON 502, in accordance with some embodiments of the disclosure. It should be understood that the bank selection component 504 of the buffer IC 402 is depicted as a high-level diagram, and as such, the bank selection component 504 may be configured to optionally include additional circuit components necessary for carrying out any of the display refresh rate and display image compensation processes described further herein.

By way of example, the buffer IC 402 can be configured to select various VCom output settings of its VCom bank selection component 504 using input from one or more dedicated pins to select a register or a bank that can be preloaded with a target output value. In some embodiments, VCOM_SEL signals may be received at a dedicated VCOM_SEL pin from the TCON 502 to select one of multiple VCom banks as the source for an output signal VCOM_TARGET. In one implementation, a specified number "N" of VCOM_SEL signals may be required to select one of 2×N possible VCom banks.

Figure 6:
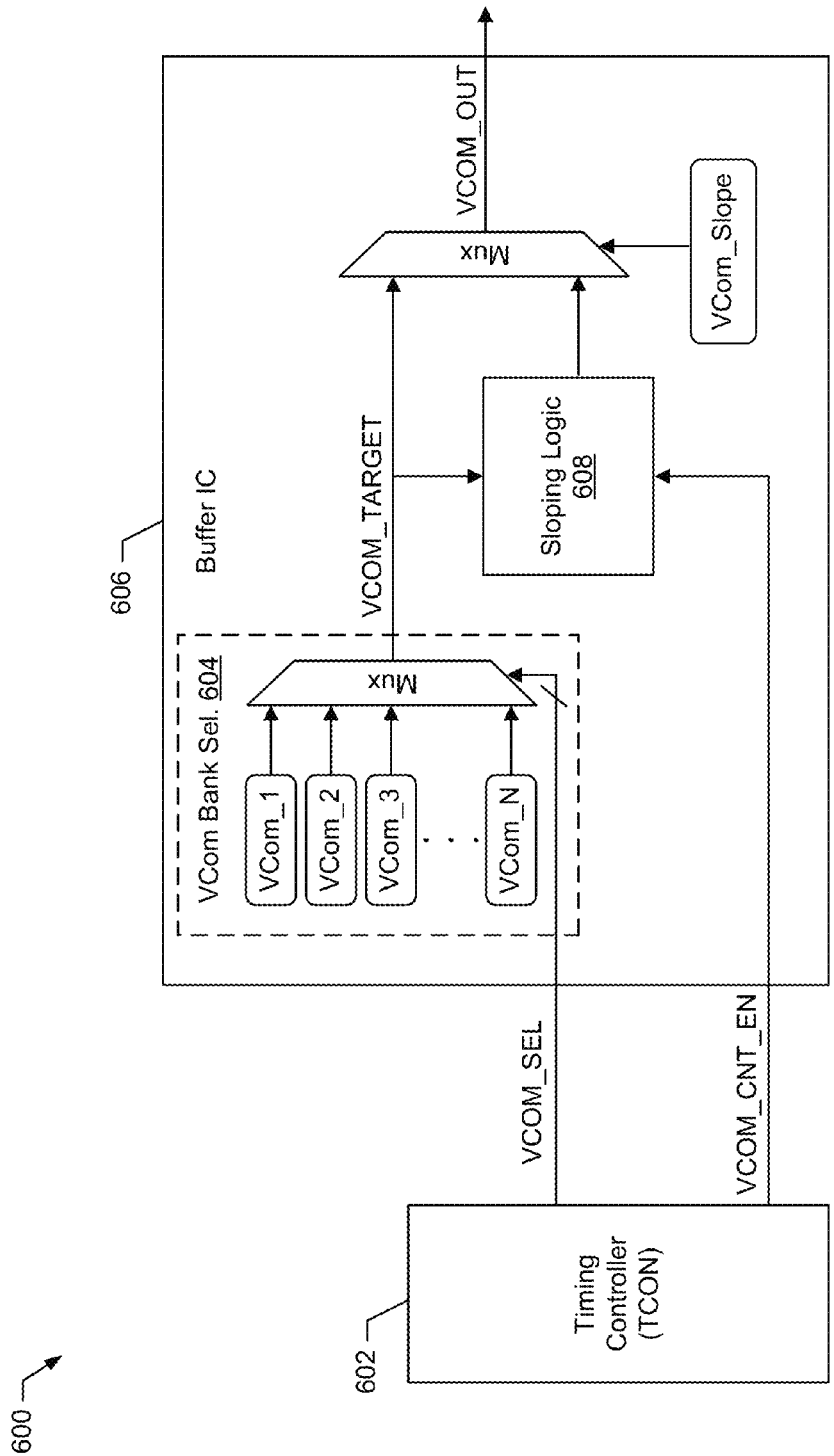
FIG. 6 shows a block diagram of a buffer IC employing slope control logic to effectuate a smooth transition between different refresh rates, in accordance with various embodiments of the disclosure.

FIG. 6 shows a block diagram 600 of a buffer IC 606 that is configured to employ slope control logic 608, in accordance with various embodiments of the invention. It should be understood that the buffer IC 606 is depicted as a high-level diagram, and as such, the buffer IC 606 may be configured to optionally include additional circuit components necessary for carrying out any of the display refresh rate and display image compensation processes described further herein. In some configurations, the buffer IC 606 can be configured to employ its VCom bank selection component 604 to perform various VCom slope control operations using one or more dedicated IC hardware input pin(s).

Figure 7:
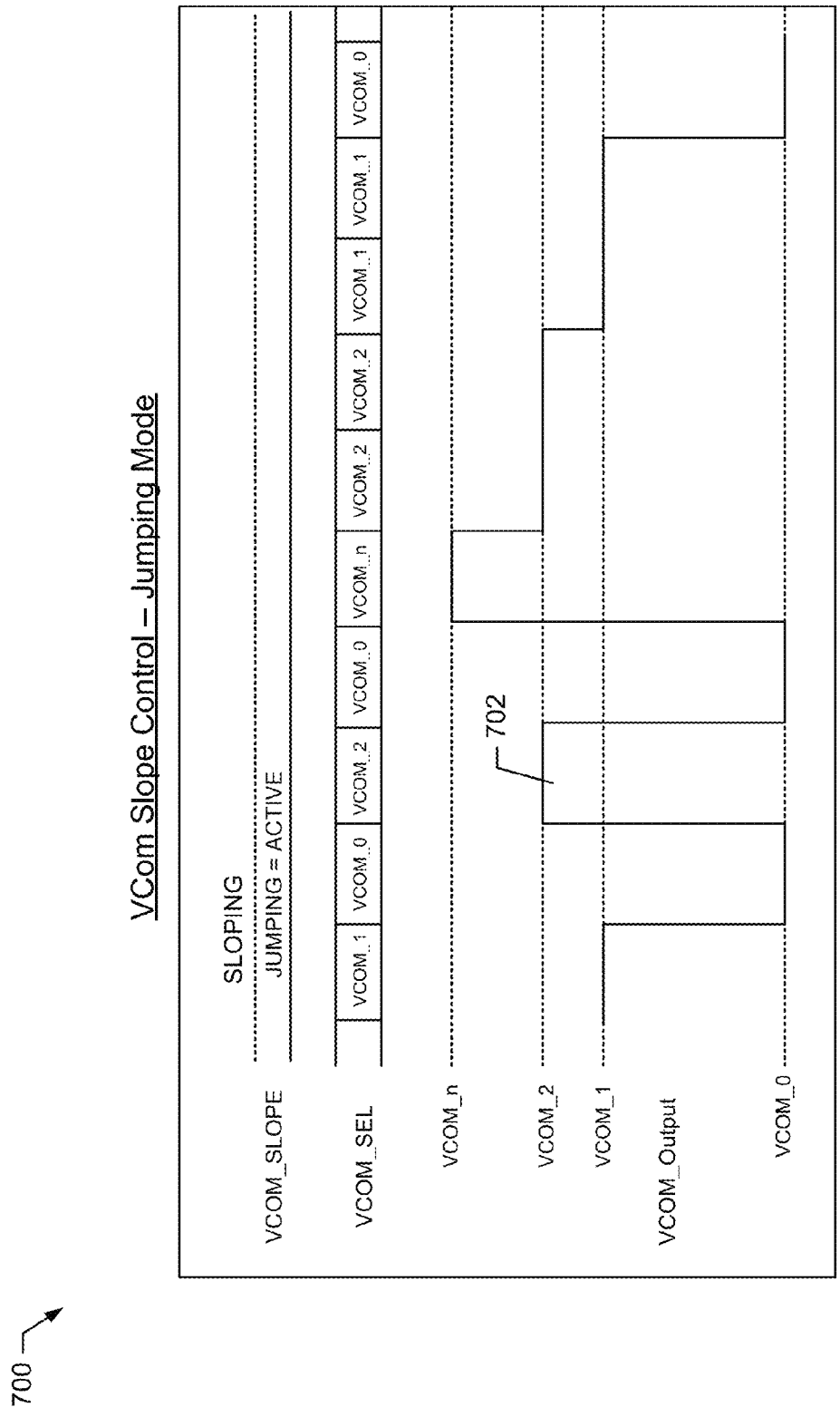
FIG. 7 shows a graph depicting VCom slope control output when the register setting results in a VCom jumping mode, in accordance with some implementations of the disclosure.
Figure 8:
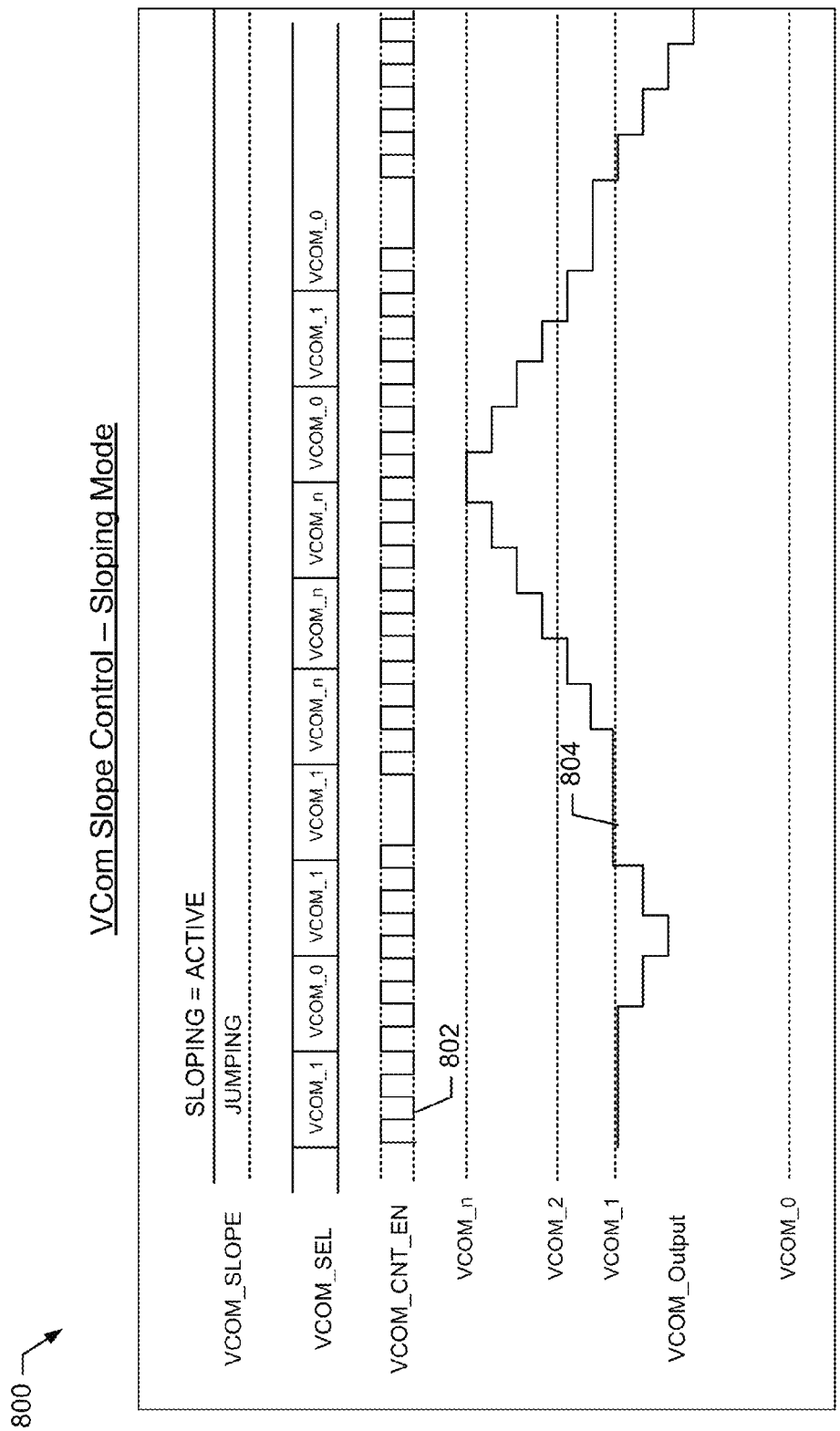
FIG. 8 shows a graph depicting VCom slope control output when the register setting results in a VCom sloping mode, in accordance with various embodiments of the disclosure.

In one implementation, the rate of change of a given VCom value observed on the output pin of the buffer IC 606 may be controlled by a hardware pin and register setting. The register setting (VCOM_SLOPE) can determine if the change is applied abruptly, by jumping, or gradually, by sloping. When a change is abrupt (e.g., while jumping), the VCOM_TARGET value can be passed directly to the output pin, VCOM_OUT. FIG. 7 shows a graph 700 depicting VCom slope control output (VCOM_OUT) when the register setting results in a VCom output 702 during a "jumping mode," in accordance with some implementations of the disclosure. FIG. 8 shows a graph depicting VCom slope control output 804 when the register setting (VCOM_SLOPE) results in a VCom "sloping mode," in accordance with various embodiments of the disclosure.

When the VCom output 804 is in a sloping mode, the VCOM_TARGET value can be passed to the sloping logic 608 as the terminal value of a counter circuit. The counter preload value can be initialized on power-up or reset with the VCOM_TARGET. The counter clock signal 802 may be an internally synchronized version of VCOM_CNT_EN input that is received from the TCON 602. The counter's up or down direction can be set with a magnitude comparator such that the count value can be progressing in the same direction as the VCOM_TARGET. In various configurations, when the VCOM_TARGET value is achieved by the counter, no further update will be applied. In this manner, the VCOM_OUT value can be gradually adjusted from a previous value to a value that is selected by VCOM_SEL. In some embodiments, the sloping rate applied by the sloping logic 608 can be determined by the frequency of VCOM_CNT_EN input pulses.

Figure 9:
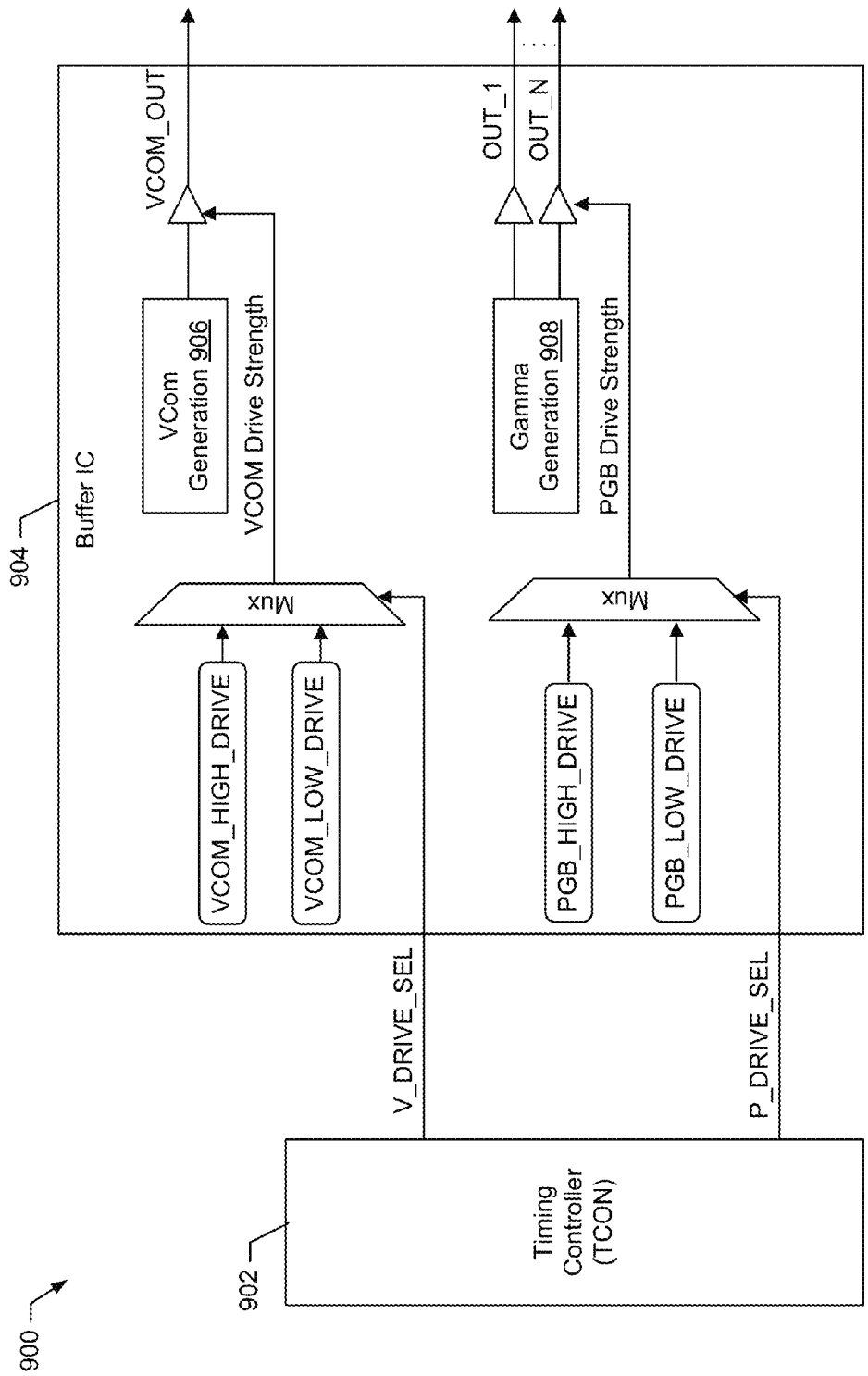
FIG. 9 shows a block diagram of a buffer IC employing output bias control, in accordance with some embodiments of the disclosure.

FIG. 9 shows a block diagram 900 of a buffer IC 904 employing output bias control, in accordance with some embodiments of the disclosure. It should be understood that the buffer IC 904 is depicted as a high-level diagram, and as such, the buffer IC may be configured to optionally include additional circuit components necessary for carrying out any of the display refresh rate and display image compensation processes described further herein. In some implementations, the buffer IC 904 may selectively control an output bias using one or more dedicated hardware pin(s), while a display system employing the buffer IC 904 is operating in accordance with a variable refresh rate (e.g., during a RRR operation). During a RRR the time between screen image updates is increased due to the lower frequency of refresh cycles. During this idle time, a display system may advantageously enter a low-power mode to conserve energy, and accordingly, the buffer IC 904 drive to a TFT panel can be reduced.

In an embodiment, a buffer IC 904 that is capable of performing bias control can be configured to support dynamic drive strength (PGB_HIGH_DRIVE, PGB_LOW_DRIVE, VCOM_HIGH_DRIVE, and VCOM_LOW_DRIVE) implementations, which may be controlled by one or more dedicated hardware pins. In some configurations, preloaded registers may contain the drive strength values for PGBs and VCOM. The associated pin (P_DRIVE_SEL or V_DRIVE_SEL) can be employed to select an output bias to be applied to the buffer in conjunction with the VCom generation 906 and Gamma generation 908 components. During various low-power idle periods, the output bias can be reduced to conserve energy; such power savings can increase in proportion with a decreasing refresh rate.

Figure 10:
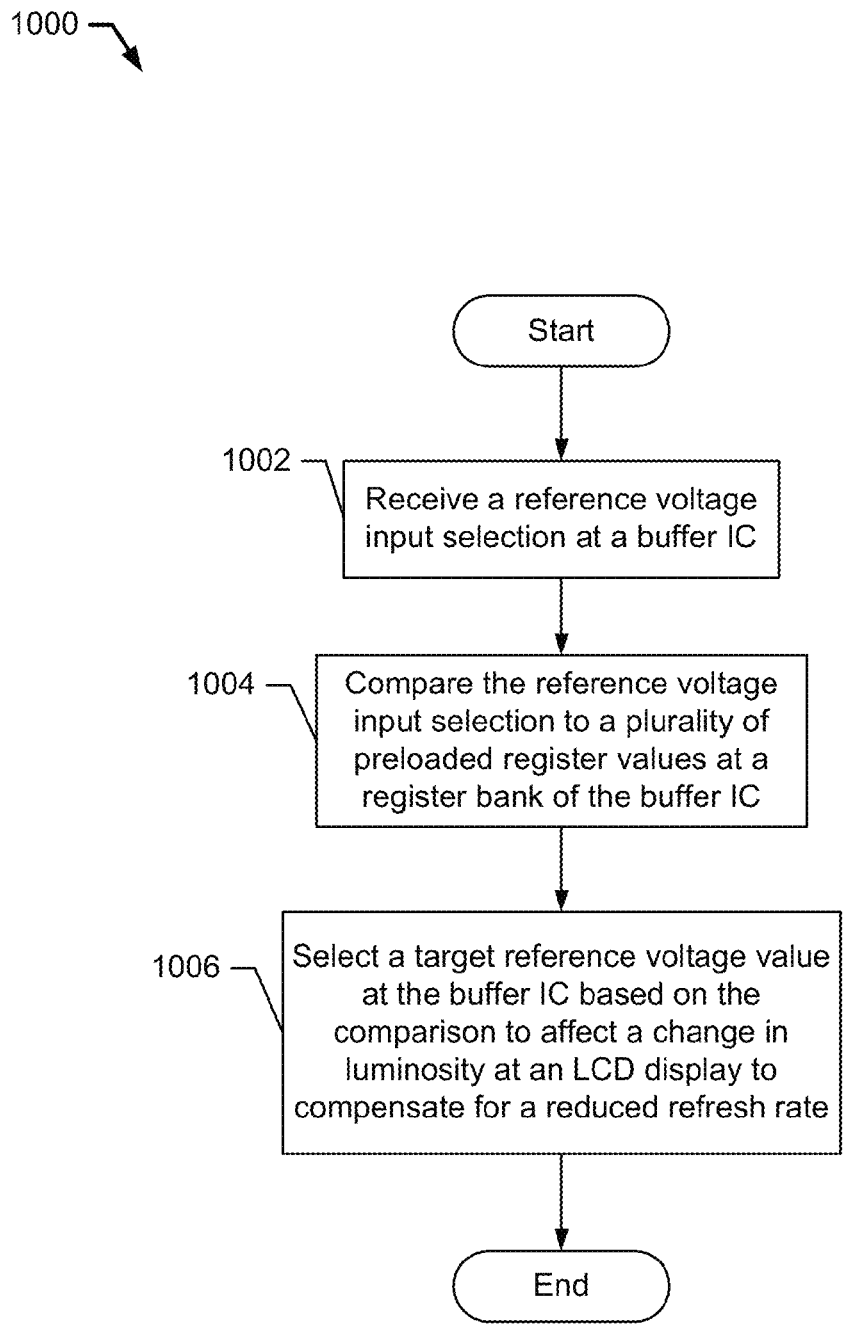
FIG. 10 shows a flow diagram depicting a procedure for compensating for an application of a RRR at a liquid crystal display (LCD), in accordance with various implementations of the disclosure.

FIG. 10 shows a flow diagram of a procedure 1000 for compensating for an application of a RRR at a liquid crystal display (LCD), in accordance with various implementations of the disclosure. It should be understood that the processes 1000 depicted in FIG. 10 may be performed by the buffer IC 116 component of the display system 104 that is depicted in FIG. 1. The buffer IC 116 of FIG. 1 is depicted in more detail within the buffer IC entities/components of FIGS. 4-6. Initially, at operation block 1002, the buffer IC 402 VCom bank selection component 504 can receive a voltage input selection (VCOM_SEL) from a timing controller 502. Then at operation block 1004, the buffer IC 402 may compare the reference voltage input selection (VCOM_SEL) to multiple preloaded register values (VCom_1 through VCOM_N) at a register bank selection component (e.g., the VCom bank selection component 504) of the buffer IC 402.

Subsequently, the buffer IC 402 can employ its VCom bank selection component 504 to select a target reference voltage value based on the comparison, to affect a change in luminosity at an LCD display (e.g., to compensate for a RRR). In this manner, the buffer IC 402 can effectively compensate for an image presentation deficiency at the LCD. In accordance with some embodiments, the image presentation deficiency may be associated with an altered luminosity level of the LCD that is caused by employing a variable refresh rate at the LCD. In some configurations, the reference voltage input selection may be received at a dedicated hardware pin of the buffer IC 402 from a display timing controller 502, and the reference voltage input selection can be received in response to an identification of the image presentation deficiency.

In accordance with one implementation, the image presentation deficiency may be identified at the buffer IC 402 or at a GPU 110 that is configured to drive the LCD. Further, the identification of the image processing deficiency can correspond to a detection of a RRR being employed by the LCD. The target reference voltage value may be selected to increase a luminosity of the LCD when the LCD is operating at a RRR or to decrease a luminosity of the LCD when the LCD is operating at an increased refresh rate.

Figure 11:
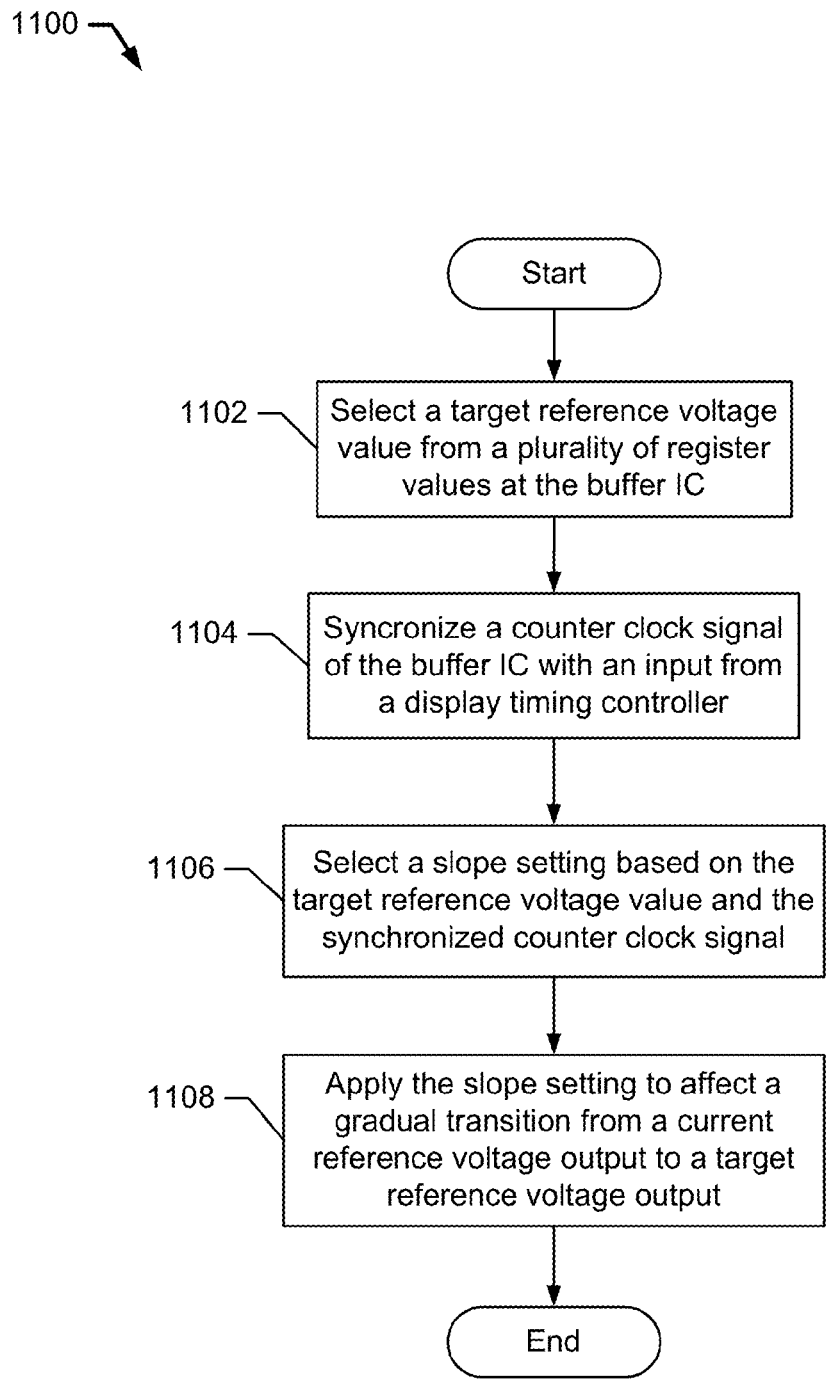
FIG. 11 shows a flow diagram depicting another procedure for compensating for an application of a RRR at an LCD, in accordance with some embodiments of the disclosure.

FIG. 11 shows a flow diagram of another procedure 1100 for compensating for an image presentation deficiency at a liquid crystal display (LCD), in accordance with some embodiments of the disclosure. It should be understood that the processes 1100 depicted in FIG. 11 may be performed by the buffer IC 116 component of the display system 104 that is depicted in FIG. 1. The buffer IC 116 of FIG. 1 is depicted in more detail within the buffer IC entities/components of FIGS. 4-6. Initially, at operation block 1102, the buffer IC 606 VCom bank selection component 604 can be configured to select a target reference voltage value (VCOM_TARGET) from a plurality of register values (VCom_1 through VCOM_N). Then, at operation block 1104, a counter clock signal of the buffer IC 606 may be synchronized with an input (VCOM_CNT_EN) signal from a display timing controller 602

Subsequently, at operation block 1106, a slope setting may be selected (e.g., at the slope logic component 608) of the buffer IC 606 based on the target reference voltage value (VCOM_TARGET) and the synchronized counter clock signal. Then, at operation block 1108, the selected slope setting may be applied at the buffer IC to affect a gradual transition from a current reference voltage output to a target reference voltage output. In accordance with various embodiments, the target reference voltage output may correspond to a voltage value that is equal to or substantially equal to (e.g., within a particular error tolerance) the target reference voltage value. It should be understood that the gradual transition from the current reference voltage output to the target reference voltage output can result in a visual presentation at the LCD that is free from perceptible image presentation artifacts caused by the transition (e.g., a transition to a RRR).

Further, the gradual transition from the current reference voltage output to the target reference voltage output may correspond to a transition between a first refresh rate and a second refresh rate employed by the LCD, where the first refresh rate is larger than the second refresh rate (e.g., a RRR), such that the second refresh rate is configured to cause the LCD to conserve power when employed. Additionally, in accordance with some configurations, the application of the slope setting by the buffer IC 606 can cause the target reference voltage output to track a direction of the synchronized counter clock signal, such that the target reference voltage output follows the counter clock signal.

In accordance with some implementations of the disclosure, the buffer IC 116 or the CD 118 of the display system 104 may include one or more component analog-to-digital converters (ADCs) and/or one or more digital-to-analog converters (DACs) having a target range of operation necessary for optimal performance, depending on the converter's application within a corresponding IC. ADC and DAC converters can be configured to perform conversion processes using various standard operational parameters, including a differential non-linearity (DNL) parameter or an integral non-linearity (INL) parameter. However, in many real world scenarios the DNL or the INL parameters provide for either under-estimate operational valuations or over-estimate operational valuations of converter performance that are too extreme and/or expensive for optimal usage within an IC.

Accordingly, it would be advantageous to employ a range non-linear (RNL) parameter that provides targeted range estimations for ADC and/or DAC conversion operations. In some embodiments, the RNL parameter may be greater than or equal to a DNL parameter, and less than or equal to the INL parameter. As such, in various implementations, the range of codes associated with the RNL parameter may be more narrowly focused within an error tolerance that would provide better signal conversion processing performance for an ADC or a DAC. However, it should be understood that the RNL range parameter may similarly be employed in accordance with many other signal processing operations where a targeted range of operational codes would be useful, as opposed to employing a broad, unfocused range of codes.

Figure 12:
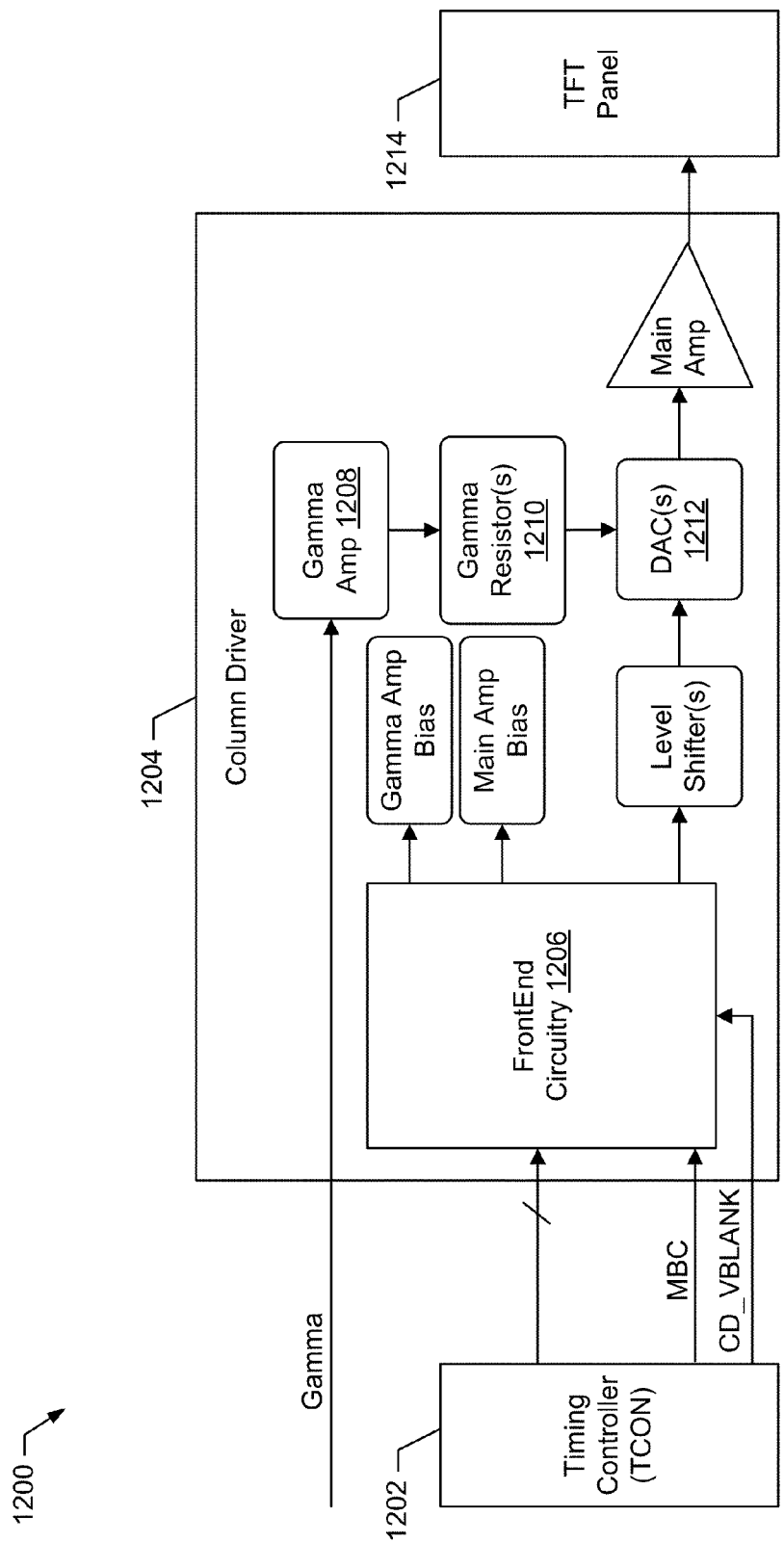
FIG. 12 shows a block diagram of a CD of a display system, in accordance with various implementations of the disclosure.

FIG. 12 shows a block diagram 1200 of a column driver (CD) 1204 of display system 104, in accordance with various implementations of the disclosure. It should be understood that the CD 1204 is depicted as a high-level diagram, and as such, the CD 1204 may be configured to optionally include additional circuit components necessary for carrying out any of the display refresh rate and display image compensation processes described further herein. It should be understood that, in some embodiments, the CD 1204 may consist of a dedicated control pin (CD_VBLANK) that can be issued one or more command signals from a TCON 1202 to dynamically shut down selective portions of a TFT panel 1214, such as in conjunction with a procedure for employing a variable refresh rate (e.g., a RRR) at the TFT panel 1214.

In this regard, signaling received at the dedicated control pin (CD_VBLANK) of the CD 1204 may be configured to selectively shut down a portion of, or portions of, the font end circuitry (e.g., the RX circuitry) of the CD 1204 in an effort to conserve power. By employing this dedicated control mechanism, the internal Gamma processes of the CD 1204 can experience fewer Gamma traces, e.g., for processing at the CD's 1204 Gamma processing components, including, but not limited to including, the Gamma Amp(s) 1208, the Gamma resistor string 1210, the DACs 1212, etc. This can result in a simpler Gamma output and a lower power rail resistance.

Figure 13:
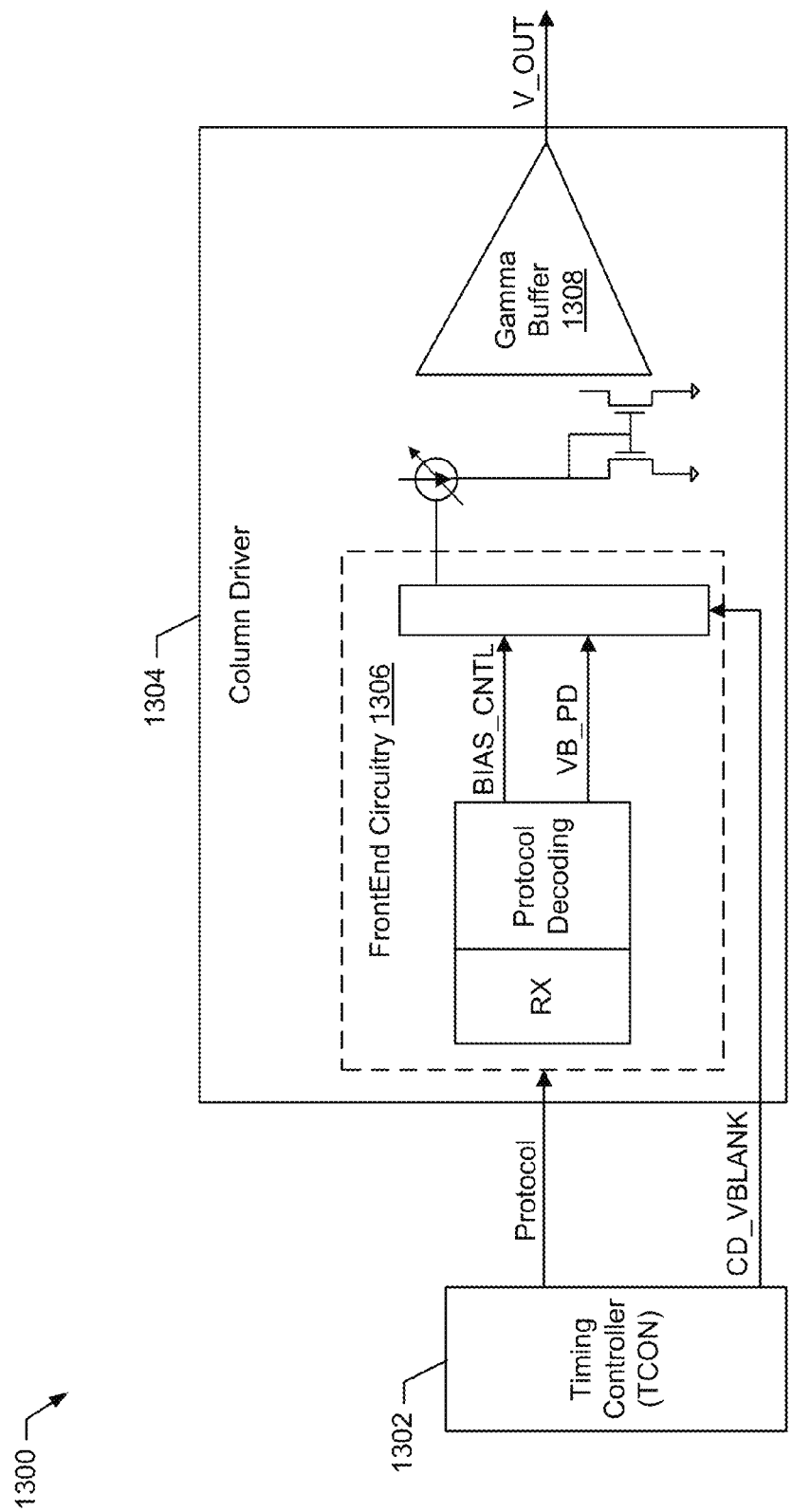
FIG. 13 shows another block diagram of a CD of display system, in accordance with various implementations of the disclosure.

FIG. 13 shows another block diagram 1300 of a CD 1304 of a display system 104, in accordance with some implementations of the disclosure. It should be understood that the CD 1304 is depicted as a high-level diagram, and as such, the CD 1304 may be configured to optionally include additional circuit components necessary for carrying out any of the display refresh rate and display image compensation processes described further herein. In accordance with various embodiments, the CD 1304 may be configured to conserve power while driving a TFT panel 120 using both a standard protocol input and/or an input received at a dedicated hardware pin (CD_VBLANK) of the CD 1304. In some configurations, in each of these power conservation methods, the selectable inputs (e.g., the protocol input and the dedicated pin input) can emanate from the TCON 1302. Using the protocol method, the protocol input from the TCON 1302 can proceed through RX and protocol decoding components of the front end circuitry 1306 (e.g., which may correspond to proprietary digital circuitry) of the CD 1304 to output BIAS_CNTL and VB_PD signals which can selectively shut down different parts (but not all parts) of the CD 1304 circuitry.

Alternatively, using the dedicated hardware pin (CD_VBLANK) method, the protocol input from the TCON 1302 can selectively shut down any or all (e.g., resulting in a total power shutdown) of the circuitry of the CD 1304, including the digital front end circuitry 1306, which may be required for operation of the previously discussed protocol method. It should be understood that the dedicated hardware pin (CD_VBLANK) method, may result in a shutdown of the CD 1304, or portions thereof, while still allowing for TCON 1302 input at the dedicated pin to define output voltages of the Gamma buffer 1308 and associated load impedances thereof. In this manner, the dedicated hardware pin method has more controllable functionality than the protocol method. Further, in various configurations, a combination of the protocol and dedicated hardware pin methods may be employed to yield a desired output for a particular IC implementation.

By way of example, Table 1, below, depicts various shutdown levels for the different circuit block components (e.g., the Gamma bias block, the Main buffer bias block, the Digital RX block, and the CD Output block) of the CD 1304 circuitry. These outputs can be defined by the different dedicated pin input (CD_VBLANK) values and/or the protocol input result (VB_PD and BIAS_CNTRL) values while in Low, High, or No ("X") operational state. Notably, only the CD_VBLANK (operating alone) can achieve a complete shutdown of all CD circuit blocks (e.g., as seen in the last row of Table 1, below).

TABLE 1

| CD_VBlank | Protocol Bits VB_PD | BIAS_CTRL | Gamma Bias | Main Buffer Bias | Digital RX | CD Output |
|---|---|---|---|---|---|---|
| Low | Low | XXX | Normal | Normal | Normal | Normal |
| Low | High | LLL | Normal | Low Bias | 100% | Last Line |
|  |  | LLH | Low Bias | Low Bias | 100% | Last Line |
|  |  | LHL | Low Bias | 0% | 100% | Floating |
|  |  | LHH | 0% | 0% | 100% | Floating |
|  |  | HLL | 100% | Low Bias | Low Bias | Last Line |
|  |  | HLH | Low Bias | Low Bias | Low Bias | Last Line |
|  |  | HHL | Low Bias | 0% | Low Bias | Floating |
|  |  | HHH | 0% | 0% | Low Bias | Floating |
| High | X | LLL | Normal | Low Bias | Low Bias | Last Line |
|  |  | LLH | Low Bias | Low Bias | Low Bias | Last Line |
|  |  | LHL | Low Bias | 0% | Low Bias | Floating |
|  |  | LHH | 0% | 0% | Low Bias | Floating |
|  |  | HLL | Normal | Low Bias | 0% | Last Line |
|  |  | HLH | Low Bias | Low Bias | 0% | Last Line |
|  |  | HHL | Low Bias | 0% | 0% | Floating |
|  |  | HHH | 0% | 0% | 0% | Floating |

Figure 14:
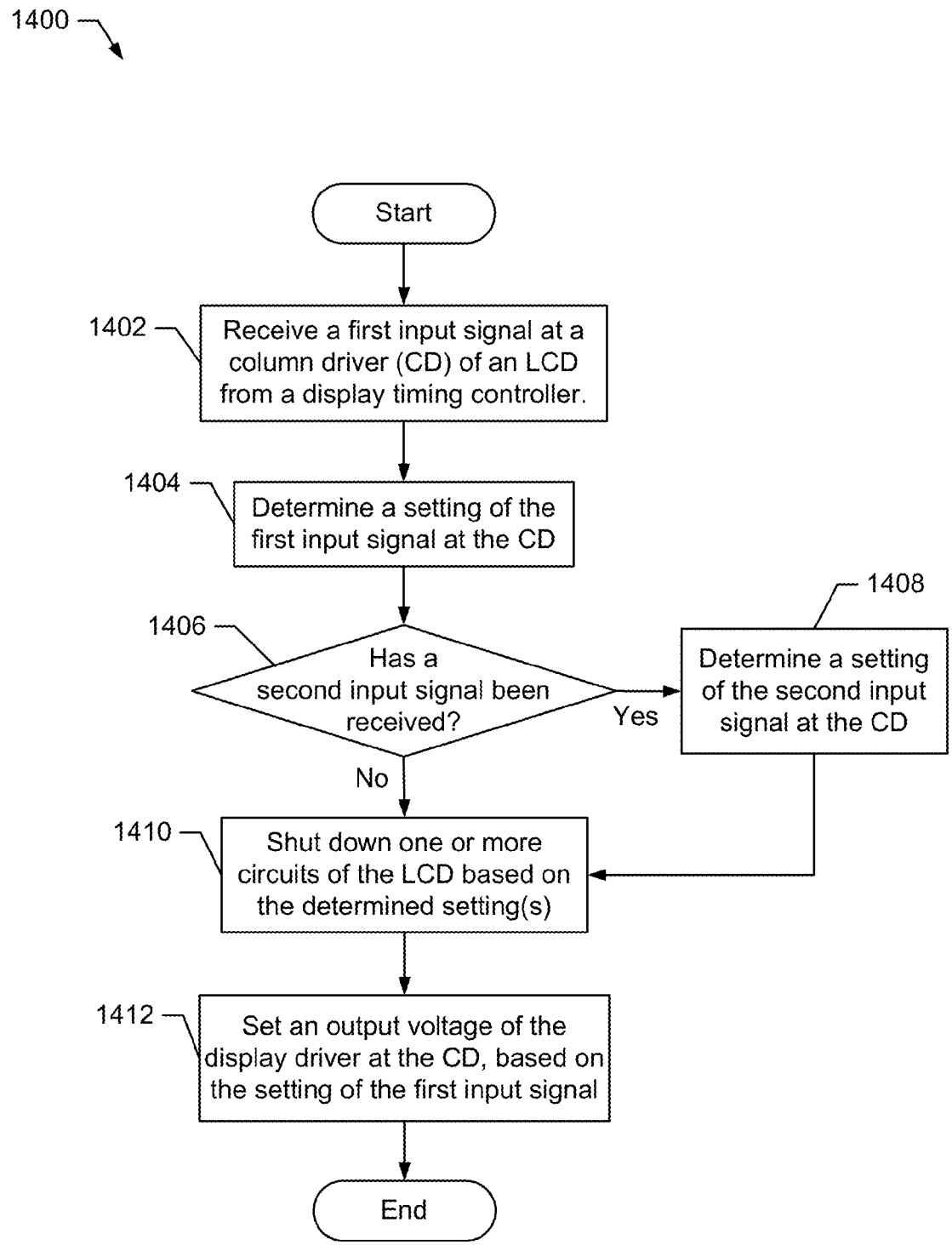
FIG. 14 shows a flow diagram depicting a procedure for conserving power at a display driver of an LCD, in accordance with various implementations of the disclosure.

FIG. 14 shows a flow diagram depicting a procedure 1400 for conserving power at a display driver (e.g., the CD 1304) of an LCD, in accordance with various implementations of the disclosure. It should be understood that the processes 1400 depicted in FIG. 14 may be performed by the CD 118 component of the display system 104 that is depicted in FIG. 1. The CD 118 of FIG. 1 is depicted in more detail within the display driver entities/components of FIGS. 12 and 13. Initially, at operation block 1402, front end circuitry 1306 of the CD 1304 may receive a first input signal (CD_VBLANK) from the TCON 1302. Next, at operation block 1404, the CD 1304 may determine a setting of the first input signal. Then, at decision block 1406, the CD 1304 can determine if another, second input signal (Protocol Signal) has been received from the TCON 1302.

In a scenario where a second input signal has been received at the CD 1304, the CD 1304 can determine a setting of the second input signal (Protocol Signal), at operation block 1408. Subsequently, the process proceeds to operation block 1410. Alternatively, in a scenario where a second input signal (Protocol Signal) was not received, the process proceeds to operation block 1410. Then, at operation block 1410, a determination is made at the front end circuitry 1306 of the CD 1304 to shut down one or more circuits of the LCD (e.g., analog and/or digital circuits of the CD 1304) based on the setting of the first input signal (CD_VBLANK) or the second input signal (Protocol Signal), or both. Thereafter, at operation block 1412, an output voltage of the CD 1304 may be set based at least in part on the determined setting of the first input signal (CD_VBLANK).

In accordance with various implementations, a digital circuit portion of the CD 1304 (e.g., a digital circuit of the front end circuitry) may be required to determine the setting of the second input signal (the Protocol Signal). In some scenarios, the setting of the second input signal may be a protocol setting that cannot shut down the digital circuit portion of the CD 1304. In another scenario, the CD 1304 may be configured to selectively shut down a digital circuit portion (e.g., a digital circuit of the front end circuitry) of the CD 1304 based on the setting of the first input signal (CD_VBLANK). In various implementations, the CD 1304 can be configured to drive a display panel of the LCD (e.g., a TFT panel 1214), and the first input signal (CD_VBLANK) may be received at a dedicated hardware pin of the CD 1304.

In some configurations, the setting of the first input signal (CD_VBLANK) can be further configured to set an impedance value at an output (V_OUT) of the CD 1304, and a display panel (e.g., a TFT panel 1214) of the LCD may act as a load at the output of the CD 1304. Further, the setting of the first input signal (CD_VBLANK) can be configured to control the output voltage of the display driver to either increase a luminosity level of a display panel of the LCD, such as when the LCD is operating at a RRR, or decrease a luminosity level of a display panel of the LCD, such as when the LCD is operating at an increased refresh rate.

Figure 15:
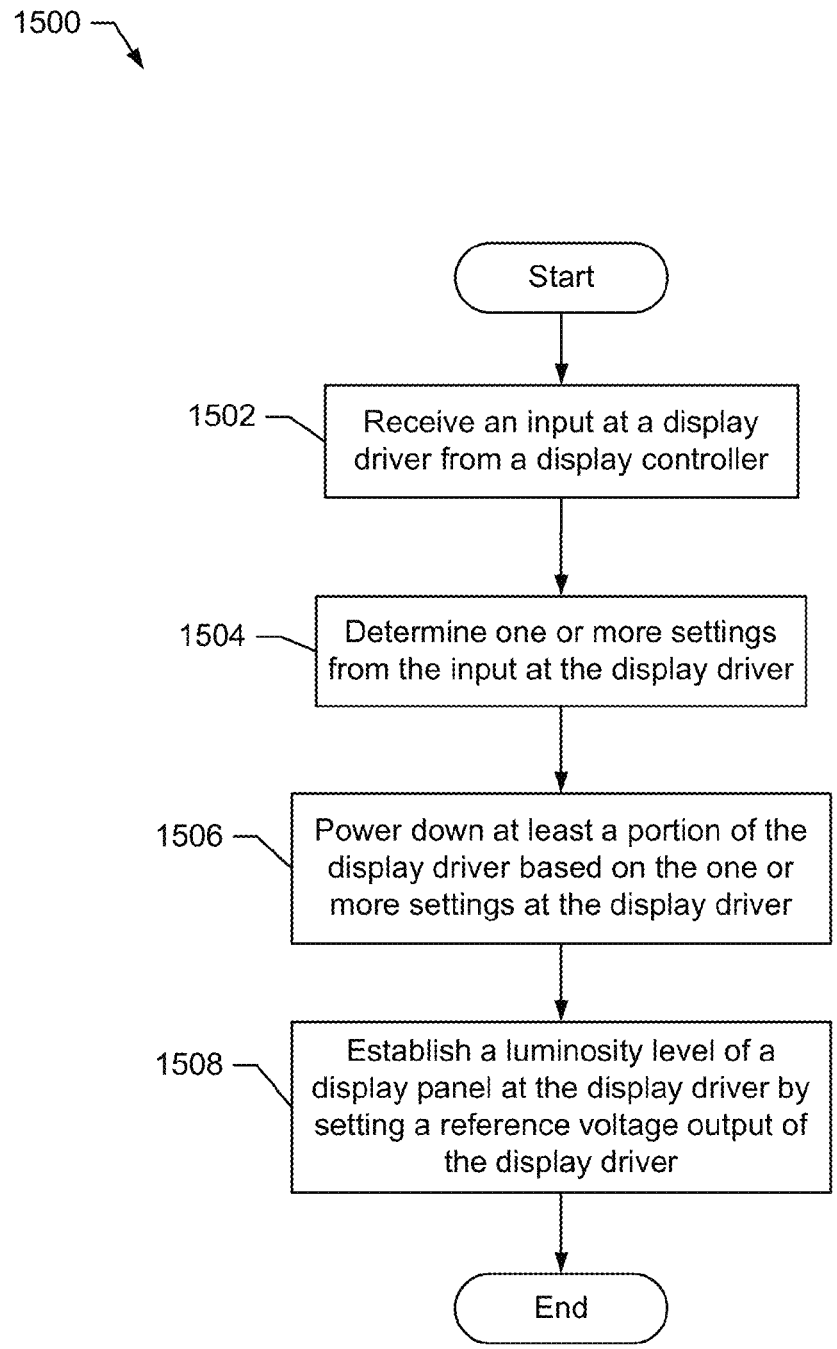
FIG. 15 shows a flow diagram depicting another procedure for conserving power at a display driver of an LCD, in accordance with some embodiments of the disclosure.

FIG. 15 shows a flow diagram depicting another procedure 1500 for conserving power at a display driver (e.g., the CD 1304) of an LCD, in accordance with some embodiments of the disclosure. It should be appreciated that the processes 1500 depicted in FIG. 15 may be performed by the CD 118 component of the display system 104 that is depicted in FIG. 1. The CD 118 of FIG. 1 is depicted in more detail within the display driver entities/components of FIGS. 12 and 13. Initially, at operation block 1402, front end circuitry 1306 of the CD 1304 may be configured to receive at least one input (CD_VBLANK and/or Protocol Signal) at a display driver (e.g., the CD 1304) from a display controller (e.g., the TCON 1302). Next, at operation block 1504, the CD 1304 can determine one or more settings from the at least one input (CD_VBLANK and/or Protocol Signal).

Subsequently, at operation block 1506, at least a portion of the display driver can be powered down and/or shut down based on the one or more settings by logic at the display driver. Then, at operation block 1508, a luminosity level of a display panel (e.g., a TFT panel 1214) can be established by the display driver by setting a reference voltage output (V_OUT) of the display driver. In some embodiments, a first setting of the one or more settings can be received as an input signal (CD_VBLANK) at a dedicated hardware pin of the display driver. In some scenarios, the first setting (CD_VBLANK) may be a non-protocol setting that is configured to shut down all circuitry of the display driver.

In various scenarios, a second setting of the one or more settings can be a protocol setting (Protocol Signal) that is not capable of shutting down a digital circuit portion (e.g., a digital circuit of the front end circuitry) of the display driver. Further, the first setting (CD_VBLANK) may be configured to set specific impedance at an output (V_OUT) of the display driver where the display panel is a load at the output of the display driver. In some implementations, the first setting (CD_VBLANK) may be configured to control the voltage value of the reference voltage output (V_OUT) to increase a luminosity level of the display panel (e.g., a TFT panel 1214) when the LCD is operating at a reduced refresh rate, or decrease a luminosity level of the display panel (e.g., a TFT panel 1214) when the LCD is operating at an increased refresh rate.

Figure 16:
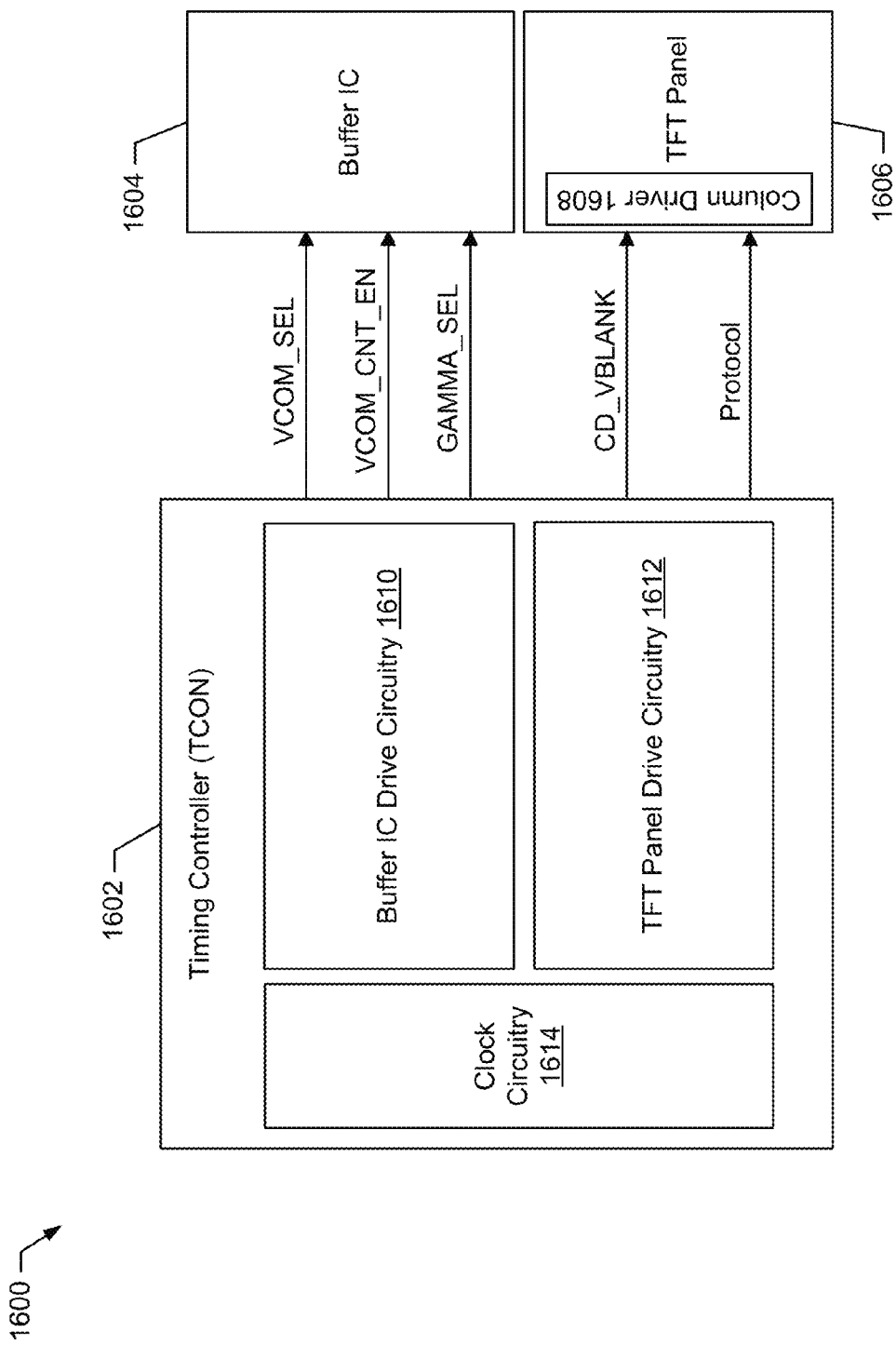
FIG. 16 shows a block diagram of a display system TCON that is configured to drive a display panel at a variable refresh rate, in accordance with various embodiments of the disclosure.

FIG. 16 shows a block diagram 1600 of a display system TCON 1602 that is configured to drive a display panel 1606 at a variable refresh rate, in accordance with various embodiments of the disclosure. It should be understood that the TCON 1602 is depicted as a high-level diagram, and as such, the TCON 1602 may be configured to optionally include additional circuit components necessary for carrying out any of the display refresh rate and display image compensation processes described further herein. The TCON 1605 can include clock circuitry 1614, buffer IC drive circuitry 1610, and TFT panel drive circuitry 1612 that can communicate various signaling (as previously described) to the buffer IC 1604 and the TFT panel 1606, including the CD 1608. This TCON signaling may include the VCOM_SEL, VCOM_CNT_EN, GAMMA_SEL, CD_VBLANK, and Protocol (e.g., eRVDS protocol) communications.

It should be understood that the CD_VBLANK and Protocol signaling can be set by the TCON 1602 in accordance with image data and control data that is received by the TCON 1602 from a CPU or any number of GPUs/VPUs 110, which may be integrated within a system on chip (SoC) integrated circuit (IC) of a host system 102. In accordance with some embodiments, the variable refresh rates employed by the TCON 1602 can allow the source (e.g., a CPU, GPU(s), or a buffer IC 1604) to effectively control the a TFT panel 1606 refresh rate (via the CD 1608), by varying the CD_VBLANK that is communicated over the TFT Panel 1606 interface link. In accordance with some embodiments, support for this feature may be limited to a single RRR (e.g., from 60 Hz to 30 Hz), or it may include multiple RRRs, meaning that the source can decide on a frame-by-frame basis whether to send a LRR frame, or a RRR frame. The active pixel part of an image frame can stay the same between a LRR (e.g., at 60 Hz) frame and a RRR (e.g., at 30 Hz) frame, such that the change in refresh rate may emanate exclusively from a designated change via vertical blanking (VBlank).

Variable refresh rate support can require several dedicated features be employed at the TCON 1602 (e.g., within the buffer IC drive circuitry 1610 or within the TFT panel drive circuitry 1612). In accordance with various implementations thereof, a significant power savings can be achieved by dynamically placing the TCON 1602, the buffer IC 1604, the CD 1608, and the TFT panel 1606, or components thereof, into various low power states during an extended VBlank period, such as in response to employing a RRR. In some embodiments, during a transition from a LRR to a RRR, or vice-versa, it may be possible for visible artifacts to appear at the TFT panel 1606, which may result from a difference in static brightness between a LRR frame and a RRR frame. These image artifacts may be perceptible when switching between or amongst various refresh rates. Several compensating mechanisms (described further herein) can be supported by the TCON 1602 to provide compensation for eliminating or reducing these unwanted visual artifacts.

As would be understood by those having ordinary skill in the field of display technology, an image frame refresh rate can be defined in terms of an individual frame. By way of example, an image frame can start immediately after the last active pixel of previous frame, and the image frame can continue until the last active pixel of the current frame is illuminated. The length of this time period is what determines the refresh rate for a current frame. A RRR can be achieved by stretching a vertical front porch (VFP) or a vertical back porch (VBP), or any combination thereof, for one or more image frame(s).

In accordance with various embodiments of the disclosure, a dynamic power consumed by the TFT panel 1606 can be reduced in proportion to an applied RRR of the display system (e.g., as implemented by the TFT panel drive circuitry 1612 of the TCON 1602). Further, vertical blanking periods can be dynamically extended to achieve RRRs while maintaining the same clock frequency at the clock circuitry 1614 of the TCON 1602. In some implementations, various power rails at the TFT panel 1606 can be dynamically shut down during extended blanking times as various display pixels may not be actively driven during this time period. Further, in some scenarios, corresponding digital circuitry may be selectively shut down in situations where the circuitry is clock-gated, such as during vertical blanking shutdown periods (e.g., in a further effort to conserve device power resources).

Figure 17:
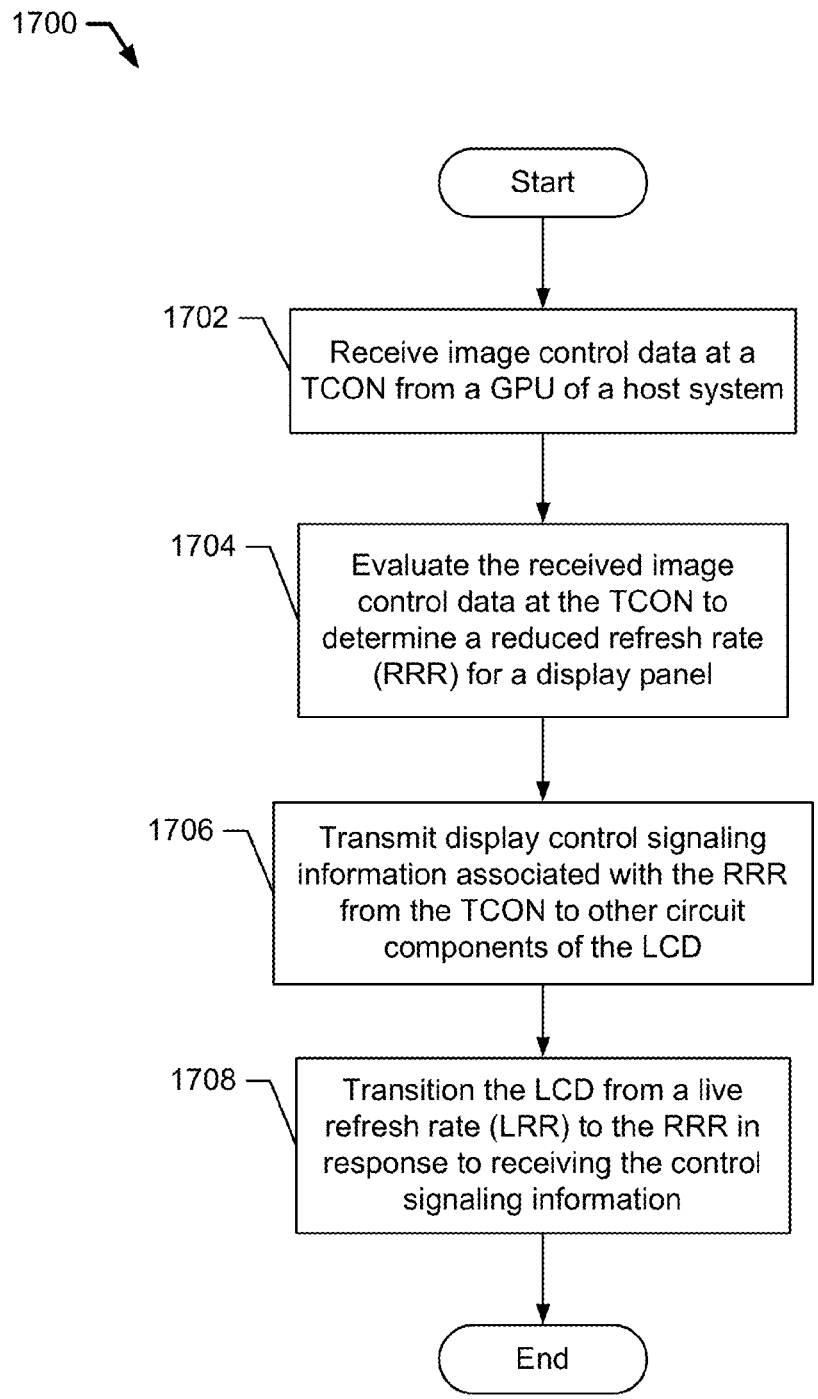
FIG. 17 shows a flow diagram depicting a procedure for establishing a RRR at an LCD display panel, in accordance with some implementations of the disclosure.

FIG. 17 shows a flow diagram depicting a procedure 1700 for establishing a RRR at an LCD display panel 1606, in accordance with some implementations of the disclosure. It should be appreciated that the processes 1700 depicted in FIG. 17 may be performed by the TCON 114 component of the display system 104 that is depicted in FIG. 1. The TCON 114 of FIG. 1 is depicted in more detail within the TCON 1602 entities/components of FIG. 16. Initially, at operation block 1702, the TCON 1602 may receive an image control data from a GPU of a host system. Then, at operation block 1704, the TCON 1602 can evaluate the received image control information to determine a corresponding RRR assignment for a display panel 1606 of a LCD.

Subsequently, at operation block 1706, the TCON 1602 can transmit display control signaling information (e.g., VCOM_SEL, VCOM_CNT_EN, GAMMA_SEL, CD_VBLANK, and Protocol Signaling) that is associated with the RRR to other circuit components (e.g., the buffer IC 1604 and the CD 1608) of the LCD. Thereafter, and in response to receiving the display control signaling information, the other circuit components (e.g., the buffer IC 1604 and the CD 1608) of the LCD (in conjunction with the TCON 1602) can effectuate a transition of the LCD from a currently employed, live refresh rate (LRR) to the target RRR. In accordance with various implementations, the display control signaling information may be further configured to affect one or more image compensation procedures to correct for an image presentation deficiency caused by operating the display panel at the RRR.

In some embodiments, the image presentation deficiency can be associated with a decreased luminosity of the display panel or one or more unwanted image artifacts caused by a transition to the RRR, and the transition to the RRR may correspond to a transition from a LRR of 50 hertz, or above, to a RRR of 40 hertz, or below. In some configurations, the TCON 1602 may be further configured to affect an immediate exit from the RRR at the display panel in response to detecting an activity at a host system (e.g., a touch input being detected at a touchscreen display of a host system) by transitioning the display panel from the RRR back to the LRR, to support active image presentation processes.

In some implementations, the TCON 1602 may include clock circuitry 1614 that is configured to drive the display panel 1606 (e.g., in conjunction with the CD 1608) at one or more RRRs, as designated by the GPU of the host system. Depending on a particular device activity, resulting in varying levels of presentation procedures (e.g., video presentation, Internet driven application presentation, static local application presentation, etc.), the TCON 1602 may receive control data requiring high-resolution (e.g., small refresh rate state transitions of 5-10 Hz, or less) or low-resolution (e.g., large refresh rate state transitions of 20-30 Hz, or greater) refresh rate transitions for an LCD display panel of a particular device. These resolution-dependent transitions may depend on any number of variables, including device mobility, current battery life states, historical or predicted display presentation processes, etc.

In various configurations, the TCON 1602 may also be composed of display buffer drive circuitry 1610 for driving a buffer circuit 1604 of the LCD, and display panel drive circuitry 1612 for controlling a display driver 1608 of the display panel 1606. The display panel 1606 of the LCD may be a thin film transistor (TFT) panel 1606, and the GPU(s) of the host system can be configured to include multiple GPUs that can dynamically render image data to the buffer circuit 1604 of the LCD using parallel graphics processing.

Figure 18:
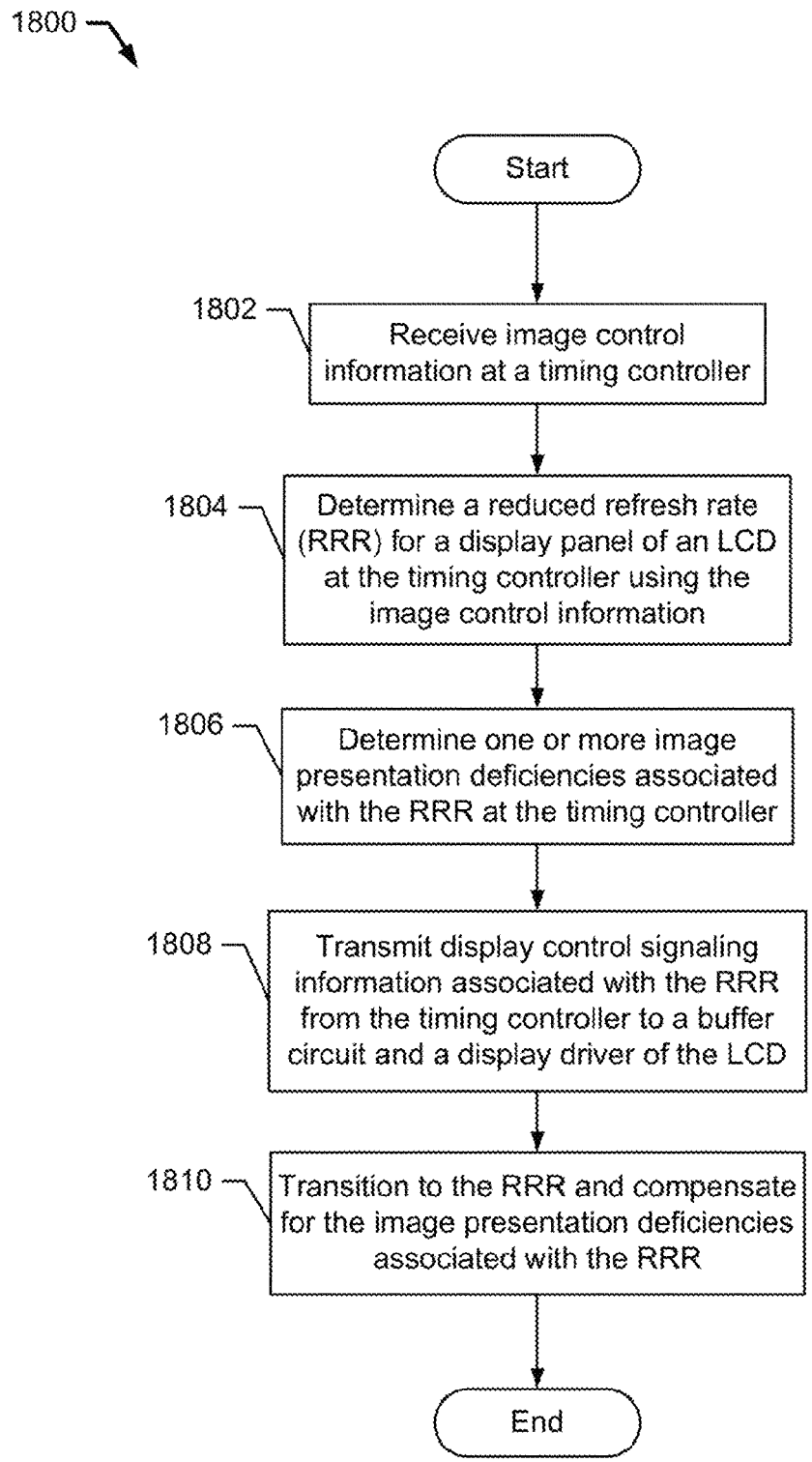
FIG. 18 shows a flow diagram depicting another procedure for establishing a RRR at an LCD display panel, in accordance with some embodiments of the disclosure.

FIG. 18 shows a flow diagram depicting another procedure 1800 for establishing a RRR at an LCD display panel 1606, in accordance with some embodiments of the disclosure. It should be appreciated that the processes 1800 depicted in FIG. 18 can be performed by the TCON 114 component of the display system 104 that is depicted in FIG. 1. The TCON 114 of FIG. 1 is depicted in more detail within the TCON 1602 entities/components of FIG. 16. Initially, at operation block 1802, the TCON 1602 may be configured to control a refresh rate at a liquid crystal display (LCD), by receiving image control information from a GPU. Subsequently, at operation block 1804, the TCON 1602 can determine a RRR for a display panel 1606 of an LCD using the received image control information.

Then, at operation block 1806, the TCON 1602 can determine one or more image presentation deficiencies that are caused by the operation of the display panel at the RRR. Next, at operation block 1808, the TCON 1602 can transmit display control signaling information associated with the RRR to a buffer circuit (e.g., the buffer IC 1604) and a display driver (e.g., the CD 1608) of the LCD. Subsequently, at operation block 1810, the LCD can be transitioned to operate at the RRR from an existing LRR, while the buffer IC 1604 and/or the CD 1608 compensate for the image presentation deficiencies (simultaneously) associated with operating the LCD at the RRR. In this manner, the panel display 1606 of the LCD can operate at the RRR in a power conservation mode, and any negative image presentation effects associated with doing so, can be cured by employing various image compensation mechanisms that can maintain visual image presentation consistency, as perceived by a user of the LCD.

In some configurations, the TCON 1602 can selectively send display control signaling information associated with the RRR to one or more components of the LCD to affect a transition to the RRR, and to compensate for the image presentation deficiencies associated with an unwanted increase or an unwanted decrease in display luminosity or brightness of the display panel 1606, as well as to compensate for unwanted image artifacts or image defects caused by a transition to a new refresh rate. In this manner, a transition between two refresh rates (e.g., between a LRR and a RRR, between a RRR and a LRR, or between two different RRRs). In some embodiments, the transition to a RRR may correspond to a transition from a LRR of 50 hertz or above, to a RRR of 40 hertz or below, and at any point in time during a display presentation, the TCON 1602 may be further configured to affect an immediate exit from the RRR at the display panel (e.g., by transitioning the display panel from the RRR back to the LRR).

Figure 19:
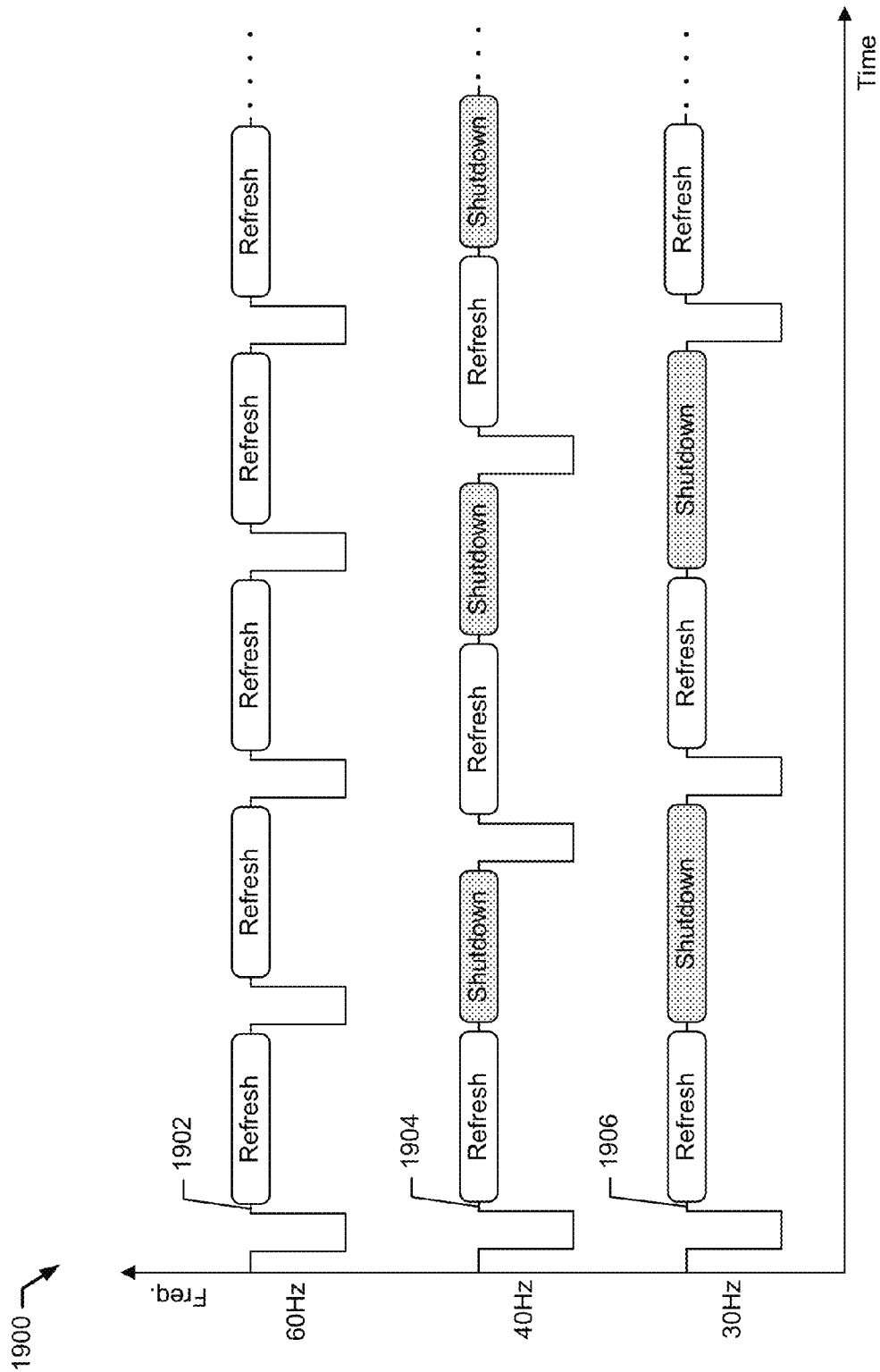
FIG. 19 shows an example refresh rate timing diagram showing the operation of and LCD display configured to employ different variable refresh rates, in accordance with various implementations of the disclosure.

FIG. 19 shows an example refresh rate timing diagram 1900 depicting the operation of an LCD that is configured to employ different, variable refresh rates, in accordance with various implementations of the disclosure. In some configurations, a default device display refresh rate may be set at 60 Hz 1902, where the refresh rate cycles at 60 Hz may have no shutdown intervals resulting from operating an LCD display panel (e.g., a TFT panel 1606) at a standard refresh rate. In this regard, it should be understood that there actually are periodic shutdown intervals at a refresh rate cycling interval of 60 Hz; however, this refresh rate is construed to be a baseline LRR for the purpose of illustratively depicting power saving advantages attributed to operating a display panel at RRRs, being lower than the baseline LRR.

In various embodiments, a RRR for a device display may be set at 40 Hz 1904, where the refresh rate cycles at 40 Hz have increased shutdown, power saving intervals resulting from operating an LCD display panel (e.g., a TFT panel 1606) at a first RRR (with reference to the LRR). The power saving benefit associated with operating a LCD at a RRR of 40 Hz may be directly proportional to a decrease in refresh rate of 20 Hz. Similarly, in other configurations, a RRR for a device display may be set at 30 Hz 1906, where the refresh rate cycles at 30 Hz have increased shutdown, power saving intervals resulting from operating an LCD display panel at a second, even lower RRR. The power saving benefit associated with operating a LCD at a RRR of 30 Hz may also be directly proportional to a decrease in refresh rate of 30 Hz, which is half of the LRR. In each of these examples, refresh rate times at 30 Hz and 40 Hz can be the same as the LRR of 60 Hz (e.g., during normal driving), but vertical blanking times can be increased during transitions between different refresh rates.

Figure 20:
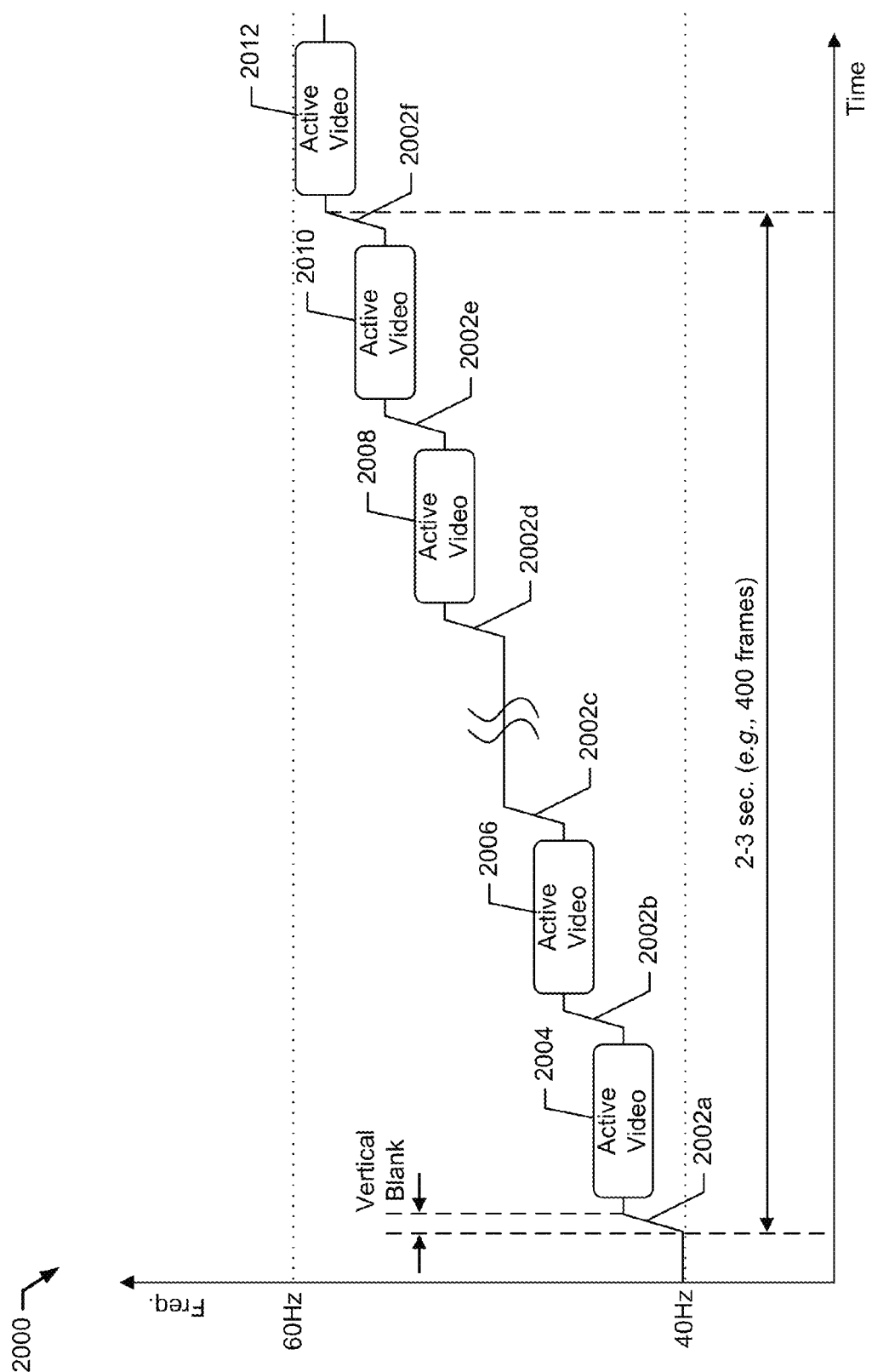
FIG. 20 shows another refresh rate timing diagram showing vertical blanking times during a transition between a first refresh rate and a second refresh rate, in accordance with various embodiments of the disclosure.

FIG. 20 shows another refresh rate timing diagram 2000 depicting vertical blanking intervals 2002*a-f* during a transition between two different refresh rates (e.g., between a refresh rate of 40 Hz and a refresh rate of 60 Hz), in accordance with some embodiments of the disclosure. During this sloping (smooth) transition between a first refresh rate of 40 Hz and an increased second refresh rate of 60 Hz, active video image frames 2004, 2006, 2008, 2010, and 2012, may be gradually increased in frequency during vertical blanking intervals.

This transition can occur in accordance with a sloping logic 608 of a buffer IC 606 of an LCD, such that during a time period of 2 to 3 seconds (corresponding to 400 image frames) power rail shutdowns during blanking times can reduce panel driving power accordingly. In this configuration, individual power supply rails of an LCD can be selectively turned back on before a next refresh rate starts. In this manner, visual artifact presentation at a display panel of an LCD can be avoided. It should be understood that a total switching time for a refresh rate transition may vary, depending on the application and timing requirements for the refresh rate transition.

Figure 21:
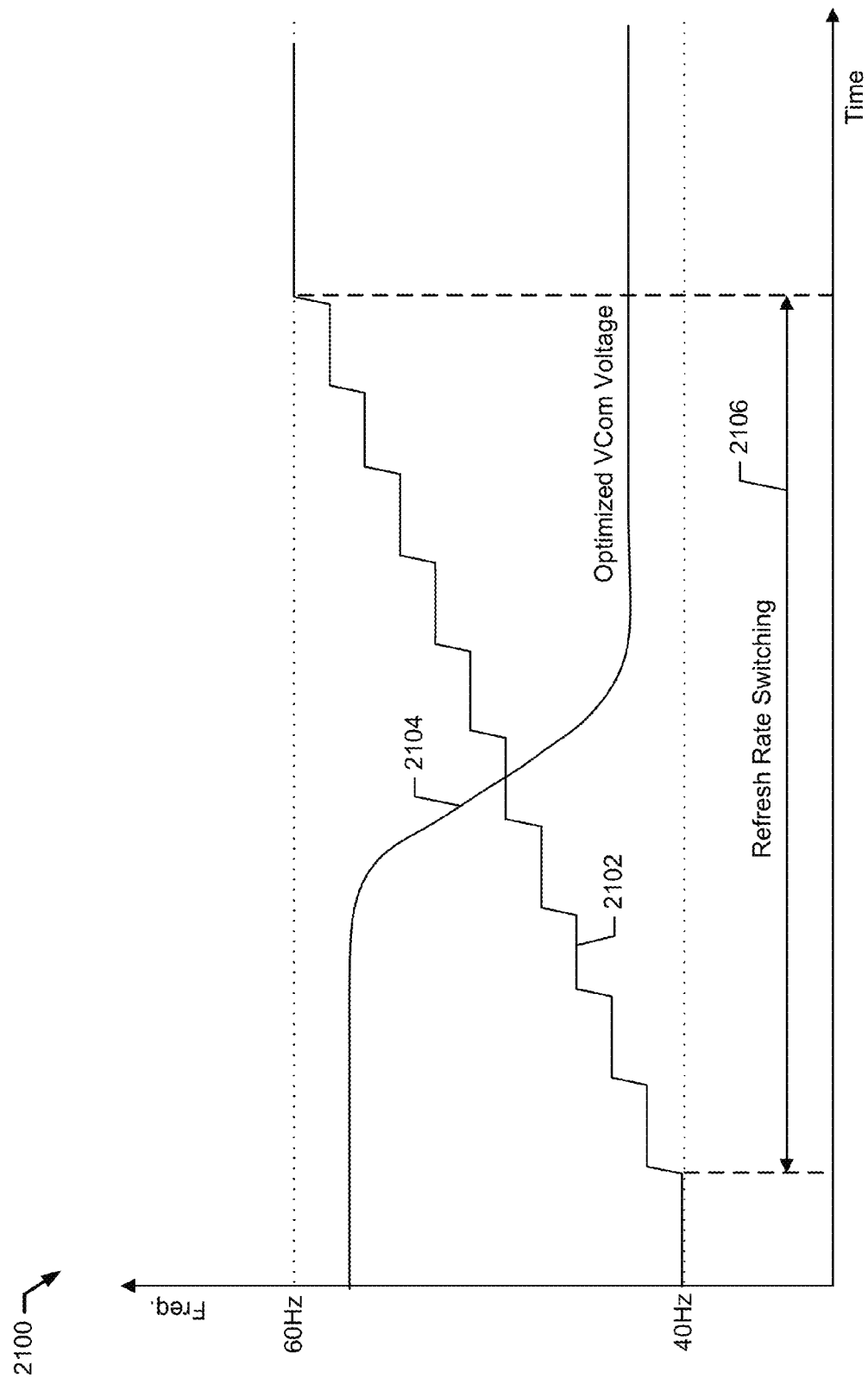
FIG. 21 shows an optimum reference voltage output plot during a variable refresh rate transition procedure, in accordance with some embodiments of the disclosure.

FIG. 21 shows an optimum reference voltage output plot during a variable refresh rate transition procedure 2100, in accordance with some embodiments of the disclosure. Depending on a refresh rate selection (VCOM_SEL) received at a buffer IC 606 from a TCON 602 a reference voltage output (VCOM_OUT), which can directly affect the luminosity of various pixels of a display panel, can be selected at the buffer IC 606 (e.g., via the VCom bank selection component 604) in accordance with a target reference voltage output (VCOM_TARGET). This target reference voltage (VCOM_TARGET) should be selected to be an optimal reference voltage value, based in part on a particular refresh rate selection (VCOM_SEL) signal emanating from the TCON 602.

In various configurations, an optimum VCom output value (depicted in the optimum VCom voltage curve 2104) can be refresh rate dependent, and therefore should be dynamically assigned. Accordingly, when a refresh rate is changed (e.g., increased or decreased) at a LCD (e.g., in accordance with corresponding GPU control data), the Vcom output voltage may be selected to minimize a perceivable brightness change, particularly during low refresh rate implementations (e.g., when a RRR is employed at an LCD). In various embodiments, the CD 1204 circuitry may be employed at the LCD to dynamically adjust VCom voltage over time.

A changing refresh rate curve 2102 is depicted during a particular refresh rate switching interval 2106 to illustrate how optimized VCom reference voltages 2104 correlate with different display panel refresh rates having a refresh rate range between 40 to 60 Hz. Although not depicted in FIG. 21, it should be understood that Gamma reference voltages (VGamma) may also be changed during variable refresh rate driving scenarios to further compensate any resulting brightness variations (e.g., when applying RRRs).

In some implementations, RRRs can be achieved by extending vertical blanking periods, while maintaining the same clock frequency values. Further, in various static and dynamic image presentation scenarios, power consumption may be reduced significantly during extended vertical blanking intervals by dynamically shutting down unnecessary circuit blocks during vertical blanking time. In some configurations, analog power rail shutdowns can have the most significant power saving impact, as compared to digital power rails shutdowns, because analog power typically occupies a significant portion of an LCD's total power consumption. Additionally, it should be understood that pixel charging time does not necessarily change with the applications described within this disclosure as a corresponding pixel clock frequency can be maintained a the same level(s).

Figure 22:
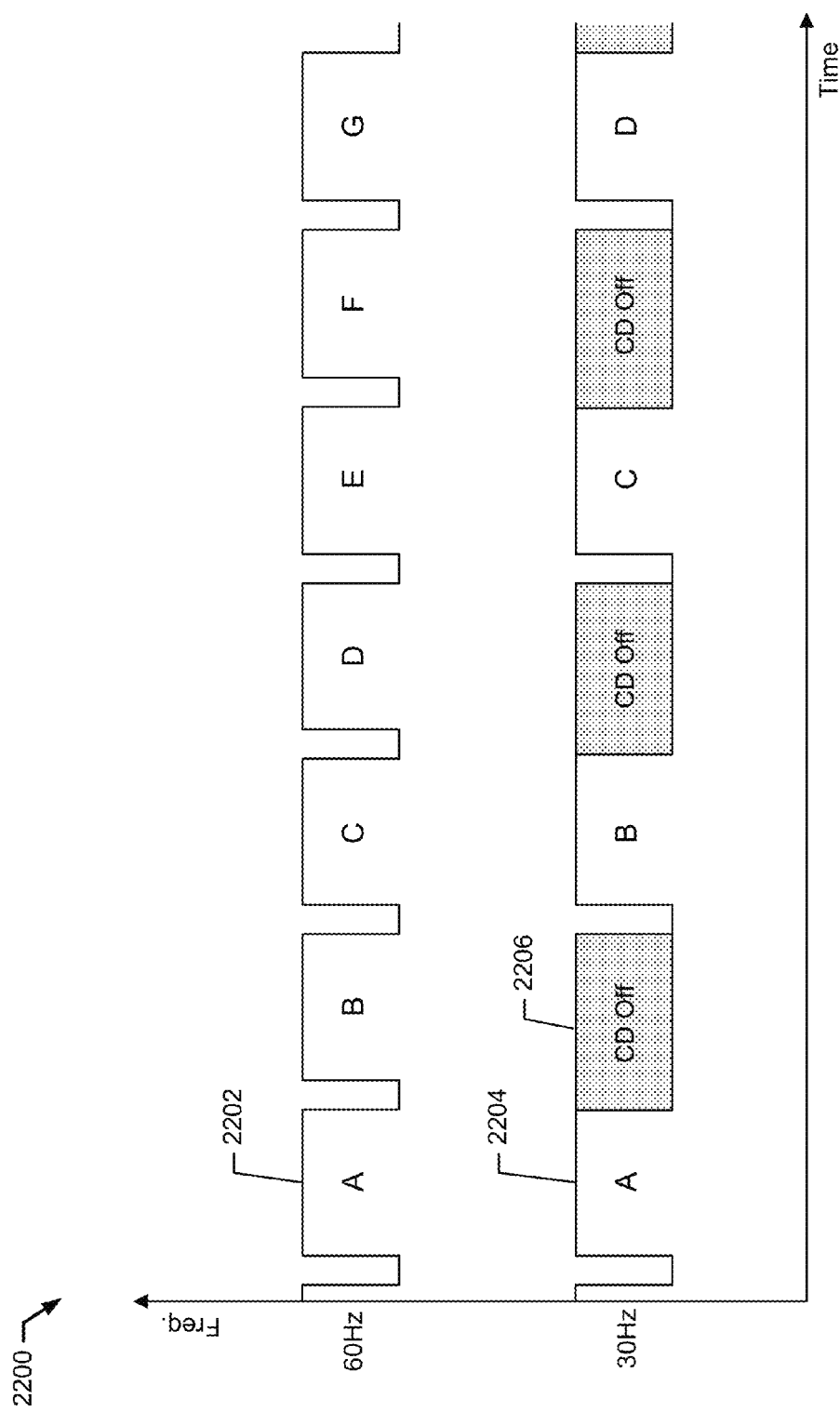
FIG. 22 shows a plot depicting an improved protocol for power conservation while operating a LCD at a RRR, in accordance with some implementations of the disclosure.

FIG. 22 shows a plot 2200 depicting a protocol for conserving power at drive circuitry of an LCD, while operating an LCD at a LRR 2202 and a RRR 2204, in accordance with some implementations of the disclosure. At a standard LRR 2202 of a 60 Hz, the protocol can switch in accordance with a refresh cycle that maintains a maximum number of corresponding power supply rail(s) within the display panel of the LCD. In this scenario, the corresponding drive circuit(s) within the LCD (e.g., at the CD) may be active and operating a full power. However, at a RRR 2204 of a 30 Hz, the protocol can switch according to a reduced refresh cycle that maintains a smaller number of corresponding active power supply rail(s) within the display panel of the LCD. In this scenario, the corresponding drive circuit(s) within the LCD may be inactive during designated "CD off" periods 2206, where at least a portion of the CD circuitry may be deactivated and/or powered down.

In accordance with some implementations, an internal power supply rail can conserve power during the designated "CD off" periods 2206 by using minimum bias currents for various amplifiers and DAC circuitry of the CD. After exiting from the "CD off" state a time to transition from a minimum bias current at the CD to a full, operational current at the CD may be minimal, to rapidly transition back to a "CD on" state. Further, in various configurations, the CD components can be activated/deactivated sequentially to reduce current variation experienced across a particular voltage supply rail.

In accordance with some embodiments, a source (e.g., a GPU) may send active pixel data to the TCON 1602, and then proceeds with the standard advanced link power management (ALPM) shutdown. By way of example, for a standard LRR frame, a corresponding interface link may be shut down for a predesignated time interval, and thereafter, the link may be brought up again (e.g., at the appropriate level to restart transmission of the next active pixel data). The total time between the end of active (EOA) point of one frame, and start of active (SOA) point for the next frame may be equal to the required vertical blanking time (e.g., as defined by the corresponding image timing level (e.g., at 60 Hz).

In some scenarios, when the source (e.g., the GPU) decides to send a RRR image frame(s), the procedure can be the same as that previously described. By way of example, the source can send the last of the active pixels, and then shut down the data processing link, in accordance with a 60 Hz image frame. However, in some scenarios, the time interval before restarting the link may have increased, such that the total time between EOA of one frame, and SOA of the next frame, can be equal to the required vertical blanking time for the RRR frame.

In accordance with some implementations, the LCD can employ an immediate exit procedure from an RRR image frame during processing. For example, in some configurations, when the source GPU has started processing a RRR image frame, and a user input occurs (e.g., input at a touchscreen display of a mobile phone or a tablet computer), it may be desirable to terminate the in-process RRR image frame vertical blanking immediately, to minimize latency between a RRR and the LRR (e.g., to improve a user's visual experience). In some scenarios, this rapid transition can include presenting a supplemental image frame to a user in accordance with an intermediate refresh rate, somewhere between LRR and the RRR, which is being exited. In some implementations, the GPU source may send these fast-response exit frames at every new frame, to effectively produce a sequence of frames with refresh rates ranging anywhere between the LRR and the RRR.

In accordance with some embodiments, a variable refresh rate implementation at an LCD can include a refresh rate detection mechanism that includes various compensation features requiring the TCON 1602 to have knowledge of the current refresh rate applied at a current image frame. In some scenarios, a GPU source may not be required to advertise the current refresh rate of the frame data being sent to the buffer IC 1604. In this configuration, the refresh rate can be determined by the TCON 1602 itself, such that the GPU can transmit a LRR frame or a RRR frame at any time, and the TCON 1602 itself can be configured to determine the appropriate action based on its own determination of the current frame's refresh rate.

In various embodiments, the TCON 1602 can accomplish this objective by maintaining a count of effective lines for a vertical blanking during a current link shutdown. In this regard, as there may be no link or data processing clock source during this time interval, the TCON 1602 can use its own internal clock circuitry 1614, and pre-programmed line timing configuration, to accurately count a number of vertical blanking lines employed during this time period. The fact that the source GPU and the TCON 1602 may be unsynchronized during this time can mean that a vertical blanking line count in the TCON 1602 may differ slightly from that in the host system (e.g., at the host CPU or GPU) due to such factors as relative clock drift, differences in virtual clock programming, etc.).

To compensate for this scenario, a register dedicated may be provided, to allow for programming of the vertical blanking time in pixel pipeline clocks, to more closely match the value from the source at the host system. Further, in some configurations, due to the necessity of supporting an immediate exit, incoming frames may have an arbitrary number of vertical blanking lines, e.g., between the LRR vertical blanking and the RRR vertical blanking. A programmable threshold may be used to make the determination of whether a particular frame is a LRR frame or a RRR frame, and that information can be transferred to downstream logic within the LCD, as required. In some embodiments, an absolute count of vertical blanking lines can be provided to any downstream LCD logic that can make intelligent compensation decisions by using the absolute count data. In various configurations, the VRR rate detection implementations can be evaluated based in part on various RRR trigger settings. In some scenarios, a LRR, a RRR, and/or a vertical blanking count can be maintained (held constant) until the subsequent trigger event.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method for employing a variable refresh rate at a liquid crystal display (LCD), the method comprising:
   receiving, by a display controller, image data from a processor of a computing device communicatively coupled to the LCD;
   determining, by the display controller, a refresh rate for the LCD based on the image data; and
   performing, by a buffer circuit connected to the display controller, a compensation operation to adjust brightness of the LCD in response to a current refresh rate changing to the determined refresh rate, wherein performing the compensation operation includes:

selecting, by the buffer circuit, a target voltage for a display driver, and setting, by the buffer circuit, a current voltage of the display driver to the target voltage to adjust brightness of the LCD.

2. The method of claim 1, wherein setting the current voltage of the display driver to the target voltage includes gradually adjusting the current voltage to the target voltage over time.

3. The method of claim 2, wherein a rate of adjustment of the current voltage is defined by a slope applied by a sloping logic of the display driver.

4. The method of claim 3, wherein the target voltage is selected to reduce power consumption of the LCD based on the refresh rate.

5. The method of claim 1, wherein the display controller includes clock circuitry for driving the LCD at one or more reduced refresh rates.

6. The method of claim 5, wherein the display controller further comprises display buffer drive circuitry for driving the buffer circuit and display panel drive circuitry for controlling the display driver of the LCD.

7. The method of claim 6, wherein the LCD includes a thin film transistor (TFT) panel and the computing device includes multiple graphics processors that dynamically render image data to the buffer circuit of the LCD using parallel graphics processing.

8. A computing device comprising:
a liquid crystal display (LCD);
a processor that generates image data for the LCD;
a timing controller that determines a refresh rate for the LCD based on the image data; and
a buffer circuit that performs a compensation operation to adjust brightness of the LCD by selecting a target voltage for a display driver, and setting a current voltage of the display driver to the target voltage for adjusting brightness of the LCD, wherein the compensation operation is performed in response to a current refresh rate changing to the determined refresh rate.

9. The computing device of claim 8, wherein setting the current voltage of the display driver to the target voltage is performed by the buffer circuit gradually adjusting the current voltage to the target voltage over time.

10. The computing device of claim 9, wherein a rate of adjustment of the current voltage is defined by a slope applied by a sloping logic of the display driver.

11. The computing device of claim 10, wherein the target voltage is selected to reduce power consumption of the LCD.

12. The computing device of claim 8, wherein the LCD is operable at one or more reduced refresh rates.

13. The computing device of claim 8, wherein the LCD includes a thin film transistor (TFT) panel and the computing device includes multiple graphics processors that dynamically render image data to the buffer circuit of the LCD using parallel graphics processing.

14. The computing device of claim 8, wherein the buffer circuit is further configured to synchronize a counter clock signal of the buffer circuit based on an input from a display controller.

15. The computing device of claim 14, wherein the buffer circuit is further configured to select a slope setting based on the target voltage and the synchronized counter clock signal.

16. A display circuit, comprising:
a timing controller configured to (i) receive image data from a processor of a computing device, and (ii) determine a refresh rate for a liquid crystal display (LCD) of the computing device based on the image data; and
a buffer circuit connected to the timing controller and configured to perform a compensation operation to adjust brightness of the LCD by selecting a target voltage for a display driver, and setting a current voltage of the display driver to the target voltage for adjusting brightness of the LCD, wherein the compensation operation is performed in response to a current refresh rate changing to the determined refresh rate.

17. The display circuit of claim 16, wherein setting the current voltage of the display driver to the target voltage is performed by the buffer circuit gradually adjusting the current voltage to the target voltage over time.

18. The display circuit of claim 17, wherein a rate of adjustment of the current voltage is defined by a slope applied by a sloping logic of the display driver.

19. The display circuit of claim 16, wherein the target voltage is selected to reduce power consumption of the LCD.

20. The display circuit of claim 16, wherein the computing device includes a display buffer drive circuitry for driving the buffer circuit and display panel drive circuitry for controlling the display driver of the LCD.

* * * * *